United States Patent [19]
Sato et al.

[11] Patent Number: 5,253,689
[45] Date of Patent: Oct. 19, 1993

[54] HEAVY DUTY RADIAL TIRE CARCASS PROFILE

[75] Inventors: Kiyoshi Sato; Kuninobu Kadota, both of Kodaira; Tatsuro Shimada, Musashimurayama; Hiroyuki Koseki, Kodaira, all of Japan

[73] Assignee: Bridgestone Corporation, Tokyo, Japan

[21] Appl. No.: 715,892

[22] Filed: Jun. 19, 1991

Related U.S. Application Data

[63] Continuation of Ser. No. 595,726, Oct. 3, 1990, abandoned, which is a continuation of Ser. No. 433,942, Nov. 9, 1989, abandoned, which is a continuation of Ser. No. 118,127, Nov. 9, 1987, Pat. No. 4,915,151.

[30] Foreign Application Priority Data

Dec. 25, 1986 [JP] Japan .................. 61-308054

[51] Int. Cl.$^5$ .............................. B60C 3/00
[52] U.S. Cl. .................................... 152/454
[58] Field of Search ............. 152/454, 209 R, 526, 152/548, 554

[56] References Cited

U.S. PATENT DOCUMENTS

| | | | |
|---|---|---|---|
| 4,082,132 | 4/1978 | Arai et al. | 152/454 X |
| 4,155,392 | 5/1979 | Duderstadt et al. | 152/209 R X |
| 4,387,758 | 6/1983 | Matsuda et al. | 152/454 |
| 4,481,994 | 11/1984 | Pommier | 152/454 |
| 4,513,802 | 4/1985 | Togashi et al. | 152/454 |
| 4,708,185 | 11/1987 | Imai et al. | 152/454 X |

FOREIGN PATENT DOCUMENTS

| | | |
|---|---|---|
| 0012694 | 6/1980 | European Pat. Off. |
| 0013194 | 7/1980 | European Pat. Off. |
| 0103984 | 3/1984 | European Pat. Off. |
| 0194108 | 9/1986 | European Pat. Off. |
| 2499473 | 2/1981 | France . |
| 2578789 | 3/1986 | France . |
| 2024738 | 1/1980 | United Kingdom . |

Primary Examiner—Geoffrey L. Knable
Attorney, Agent, or Firm—Sughrue, Mion, Zinn, Macpeak & Seas

[57] ABSTRACT

A heavy duty radial tire includes at least one radial carcass extending from one bead portion to the other bead portion and using inextensible cords and a belt arranged outwardly of the radial carcass for reinforcing a tread of the tire. The tire comprises, during expanding of the tire from 5% to 100% of a normal inner pressure, a first profile portion expanding radially outwardly in a tread zone, a second profile portion depressing axially inwardly of the tire in a radially outer zone of a sidewall from one end of said tread to a tire maximum width position when filled with the normal inner pressure, and a third profile portion expanding axially outwardly of the tire in a radially inner zone of the sidewall from the tire maximum width position when filled with the normal inner pressure to a parting point of the sidewall from the rim, thereby properly distributing strains occurring in the tire in filling with the normal inner pressure.

2 Claims, 18 Drawing Sheets

FIG_1

FIG._11
PRIOR ART

FIG_13

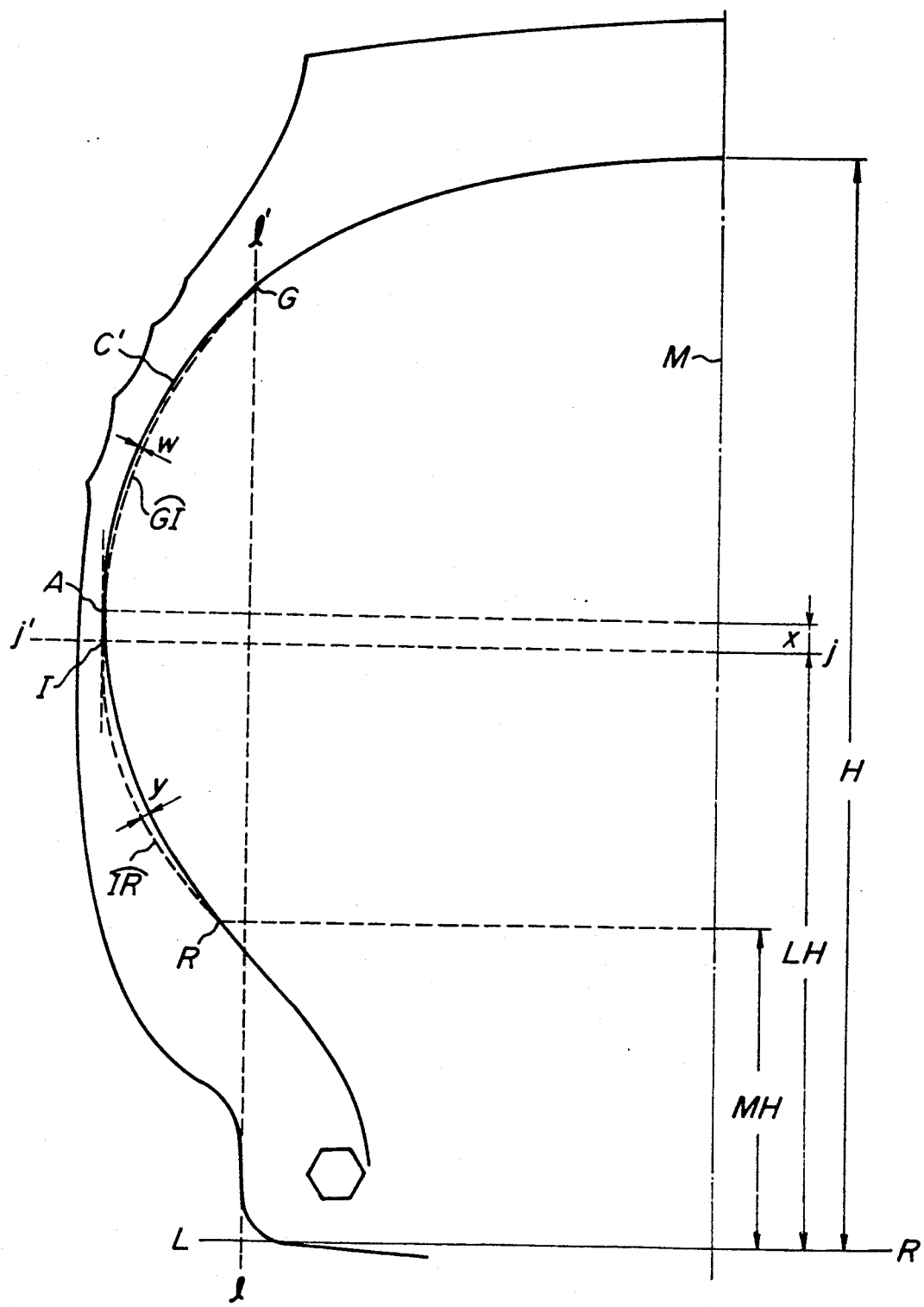
FIG_15

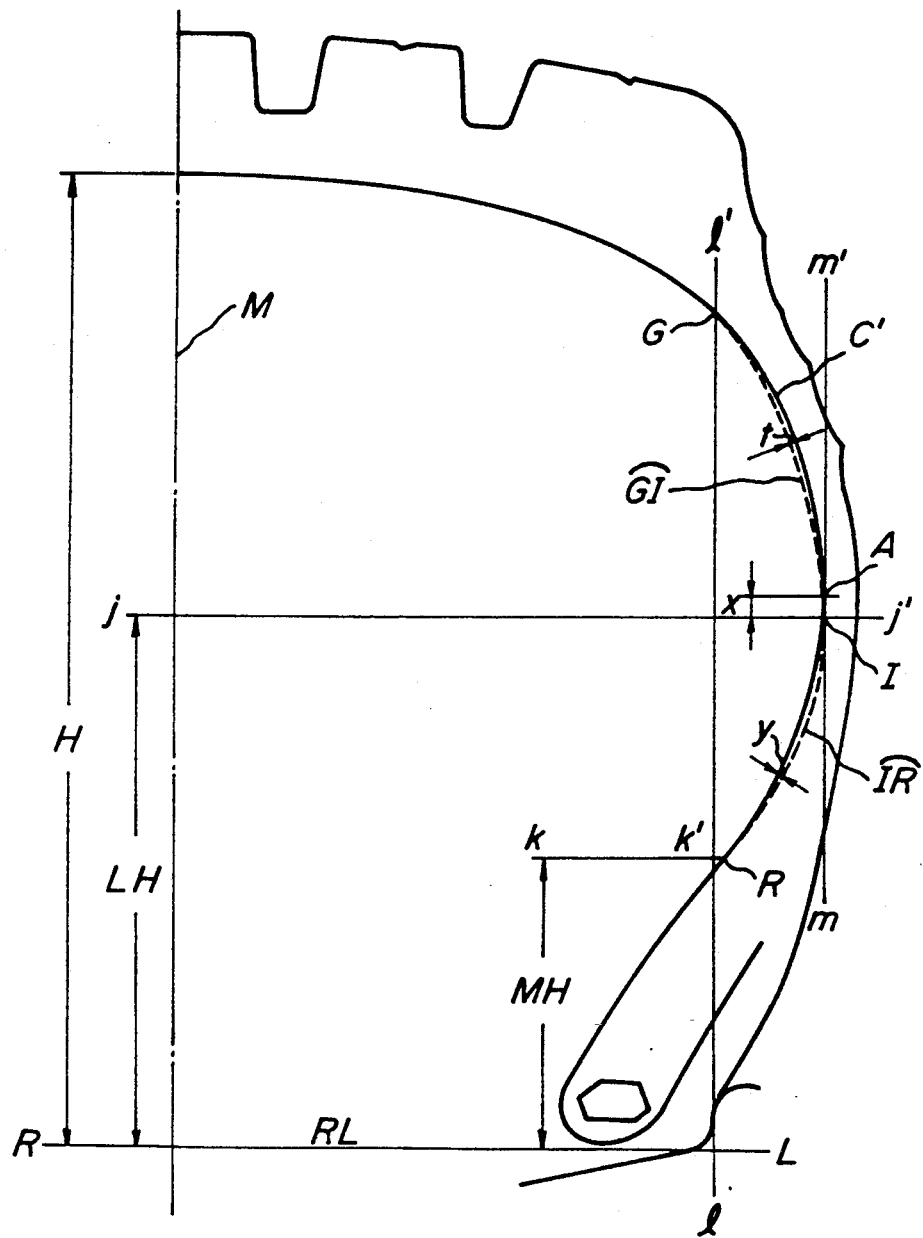
FIG_16

FIG_17
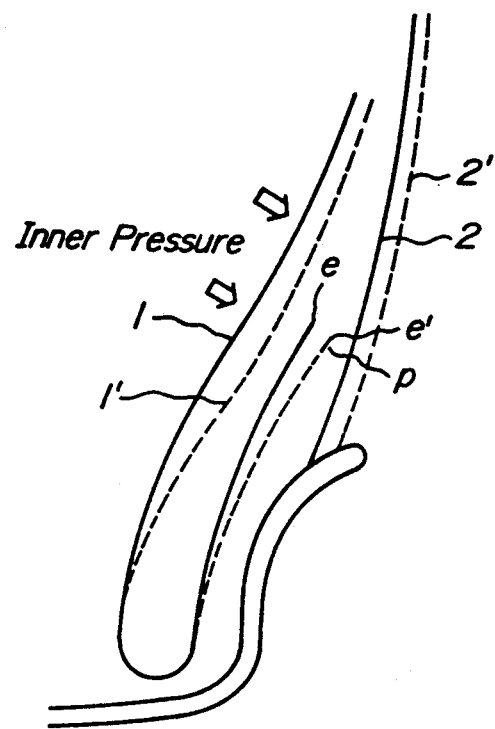
FIG_18
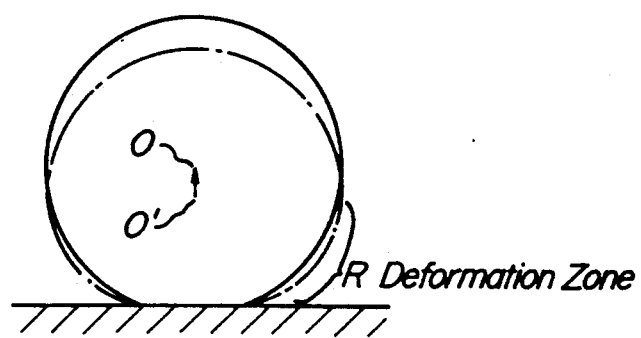

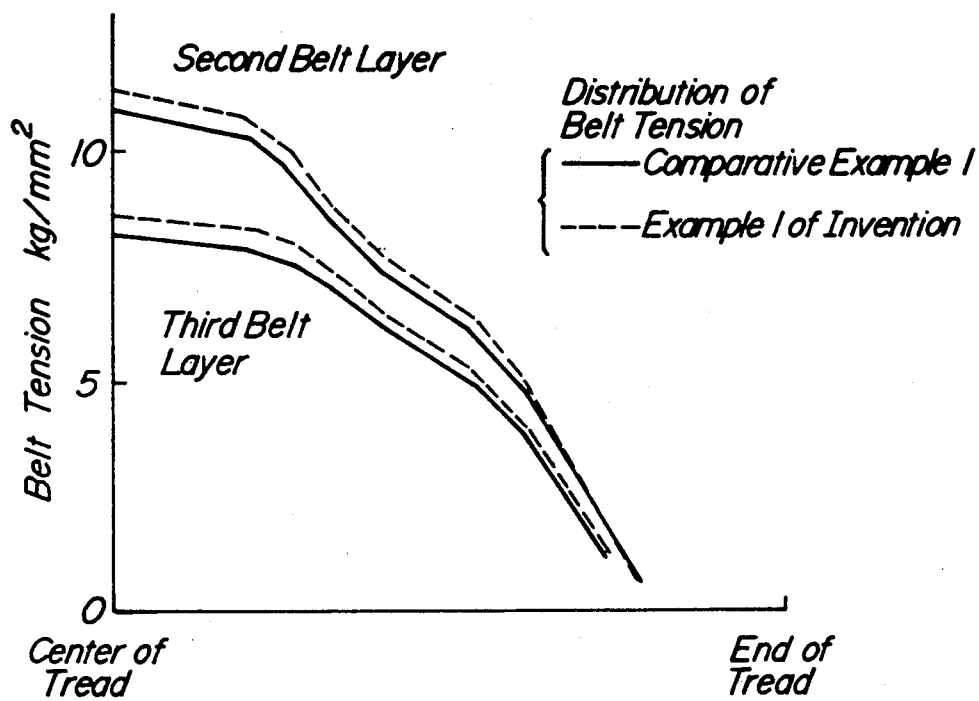
FIG_19

HEAVY DUTY RADIAL TIRE CARCASS PROFILE

This is a continuation of application Ser. No. 07/595,726 filed Oct. 3, 1990, now abandoned, which was a continuation of application Ser. No. 07/433,942 filed on Nov. 9, 1989, now abandoned, which in turn was a continuation of application Ser. No. 07/118,127 filed on Nov. 9, 1987 and is now U.S. Pat. No. 4,915,151.

BACKGROUND OF THE INVENTION

This invention relates to a pneumatic radial tire and more particularly to a heavy duty radial tire for trucks or buses, whose durability is improved by preventing separations occurring at ends of a belt for reinforcing a tread and at ends of carcass plies for principally reinforcing the tire.

In order to improve the durability of bead portions of pneumatic radial tires, techniques of turn up of carcass plies and materials and constructions of chafers or stiffeners as reinforcements have been generally investigated. However, with all proposed solutions, applications are limited to tires of some particular sizes although they are relatively effective for tires of some limited sizes. Moreover, proposed solutions sometimes tend to increase costs of tires. Therefore, a fundamental solution has not been provided yet.

In order to obtain required performances of tires, in general, carcass configurations have been determined so as to expand uniformly when filled with inner pressure. The equilibrium configuration curve of a carcass line of a tire has been used in this industrial field, which is based on the so-called "natural equilibrium theory" assuming that carcass cords are not extensible and deformations of the tire are not affected by inner pressures. A carcasses of such a tire is uniformly subjected to tensile forces and therefore its various performances are good. However, such a tire is a theoretical one which could not exist in fact. It is considered that an actual tire which approximates to such a theoretical tire as much as possible can be obtained by making the actual tire which uniformly inflates or is similar in figure before and after the inflation. An actual tire obtained in this manner has a "natural equilibrium shape" of a carcass. In the following publications disclosed hitherto measures for controlling the change in shape of tires when they are filled with inner pressure have been employed.

In U.S. Pat. No. 4,155,392, when a tire is being filled with inner pressure, maximum width portions of the tire are displaced radially inwardly to reduce tensile strains occurring in sidewalls, thereby improving the durability of the life of the tire referring to FIG. 3 of the U.S. Pat. No. 4,155,392. In this case, however, parts of a tread and shoulders are also moved axially and radially inwardly to reduce initial tensions acting upon a belt of the tire so that moving performances of the tire and durability at ends of the belt are detrimentally affected.

U.S. Pat. No. 4,481,994 discloses a technique similar to the measure disclosed in the above United States Patent specification. In this case, portions extending from ends of a belt to shoulders are also moved axially and radially inwardly of a tire when filling normal pressure. As a result, initial tensions of the belt become small which detrimentally affect various performances of the tire.

Moreover, U.S. Pat. No. 4,513,802 discloses a feature of changing a tire configuration to reduce the rolling resistance of a tire. In this case, however, as radially outward portions of sidewalls outwardly expand when filling normal inner pressure, expanding deformations are insufficient in bead portions and tread portion. Therefore, strain distributions in the tire resulting from the expanding deformations are improper and therefore sufficient durability for heavy duty tires is not obtained.

SUMMARY OF THE INVENTION

It is a principal object of the invention to provide a heavy duty pneumatic tire whose durability at bead and belt portions is effectively improved without detrimentally affecting other portions of the tire.

In order to accomplish this object, in a heavy duty radial tire including at least one radial carcass extending from one bead portion to the other bead portion and using inextensible cords and a belt arranged outwardly of the radial carcass for reinforcing a tread of the tire according to the invention, the improvement comprises an outer profile of the tire in radial cross-sections mounted on an approved rim whose width is not wider than that of a design rim and under no load condition during filling inner pressure from 5% to 100% of a normal inner pressure, said outer profile of the tire comprising a first profile portion expanding radially outwardly in a tread zone from one end of said tread through a crown center to the other end of said tread, a second profile portion depressing axially inwardly of the tire at least in a part of a radially outer zone of a sidewall from said one end of said tread to a tire maximum width position when filled with the normal inner pressure, and a third profile portion expanding axially outwardly of the tire in a radially inner zone of said sidewall from said tire maximum width position when filled with the normal inner pressure to a parting point of the sidewall from said rim, thereby properly distributing strains occurring in the tire in filling with the normal inner pressure.

The invention by which a useful improvement of the heavy duty radial tire is accomplished resides in the discovery that strain distributions in the tire suitable for improving the durability of the tire can be obtained by a novel and excellent measure for controlling the change in configuration of the tire when it is filled with inner pressure.

In order that the invention may be more clearly understood, preferred embodiments will be described, by way of example, with reference to the accompanying drawings.

BRIEF DESCRIPTION OF THE DRAWINGS

FIGS. 15 and 16 are radial cross-sections of tires of the prior art;

FIG. 17 is a schematic sectional view of a tire for explaining an advantage of the tire according to the invention;

FIG. 18 is a schematic view of a tire for explaining another advantage of the tire according to the invention; and FIG. 19 is a graph illustrating belt tensions in the tire according to the invention and a tire of the prior art.

DESCRIPTION OF THE PREFERRED EMBODIMENTS

Figure 1:
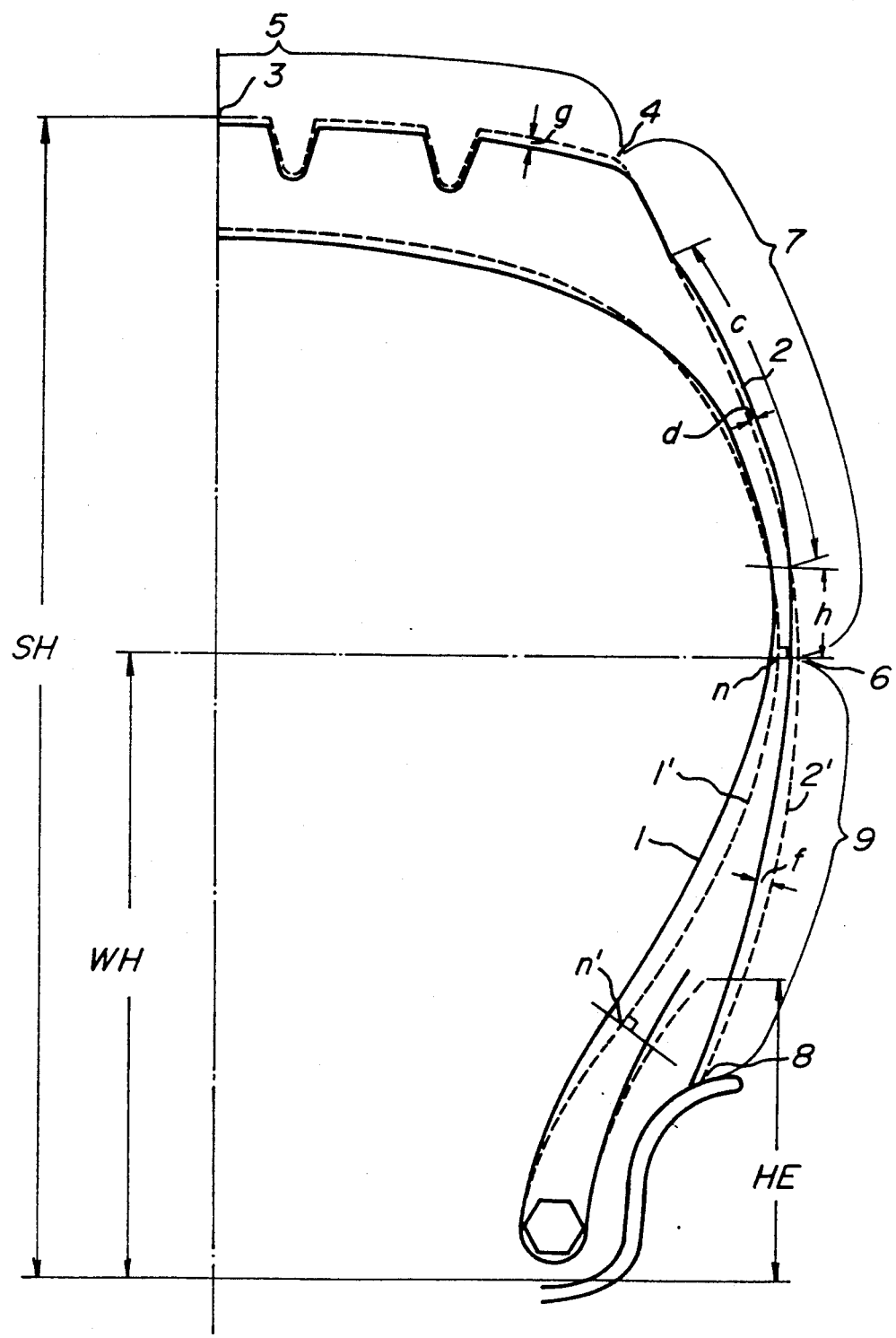
FIG. 1 is a radial cross-section illustrating one fourth of a heavy duty radial tire using a 5° flat base rim according to the invention.
Figure 2:
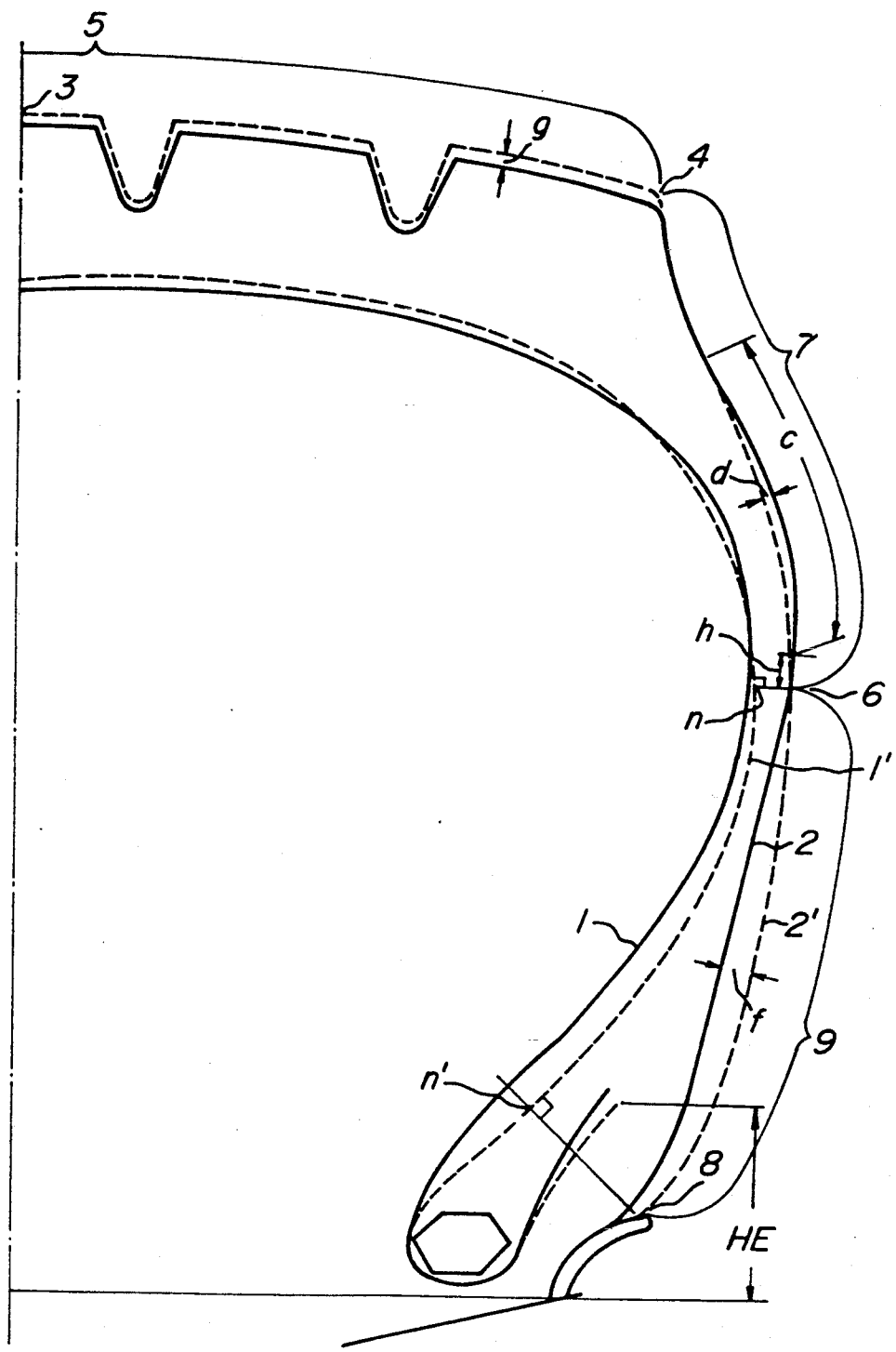
FIG. 2 is a radial cross-section illustrating one fourth of a heavy duty radial tire using a 15° drop center rim according to the invention.

FIGS. 1 and 2 illustrate heavy duty radial tires of different sizes according to the invention. In each drawing, solid lines illustrate carcass path lines 1 and a tire profile 2 determined thereby in a radial cross-section under a standard status when the tire mounted on a rim is filled with an inner pressure 5% of a normal inner pressure. A belt on a carcass for reinforcing a tread is arranged in lamination embedded in a tread of the tire substantially over an overall width of the tread in substantially the same manner as in tires of the prior art although the belt is not shown in order to avoid a complication caused by deformations of the tire.

The standard status of a tire is defined herein by the change in configuration or the condition when filled with the slight pressure for reason that it is necessary for the present invention to keep configurations of the tire and carcass in any radial cross-sections when the tire formed and vulcanized in a mold is mounted on a design rim among approved rims with a narrowed distance between beads of the tire or a rim having a width not wider than that of the design rim.

In case that a tire is difficult to fit on a rim or a tire is considerably deformed due to piled or stored conditions, after the tire is filled with normal inner pressure and kept for more than twenty four hours, the inner pressure is exhausted to 5% of the normal inner pressure. When carcass deformations of tires are extreme due to stored conditions, the inner pressure is exhausted to 5% of the normal inner pressure after removing particularly deformed shapes by running of several tens km. In this manner, a precise standard shape of the tire is obtained. The status of the tire at this moment, which keeps configurations of the tire and the carcass can be used a standard status.

Figure 3:
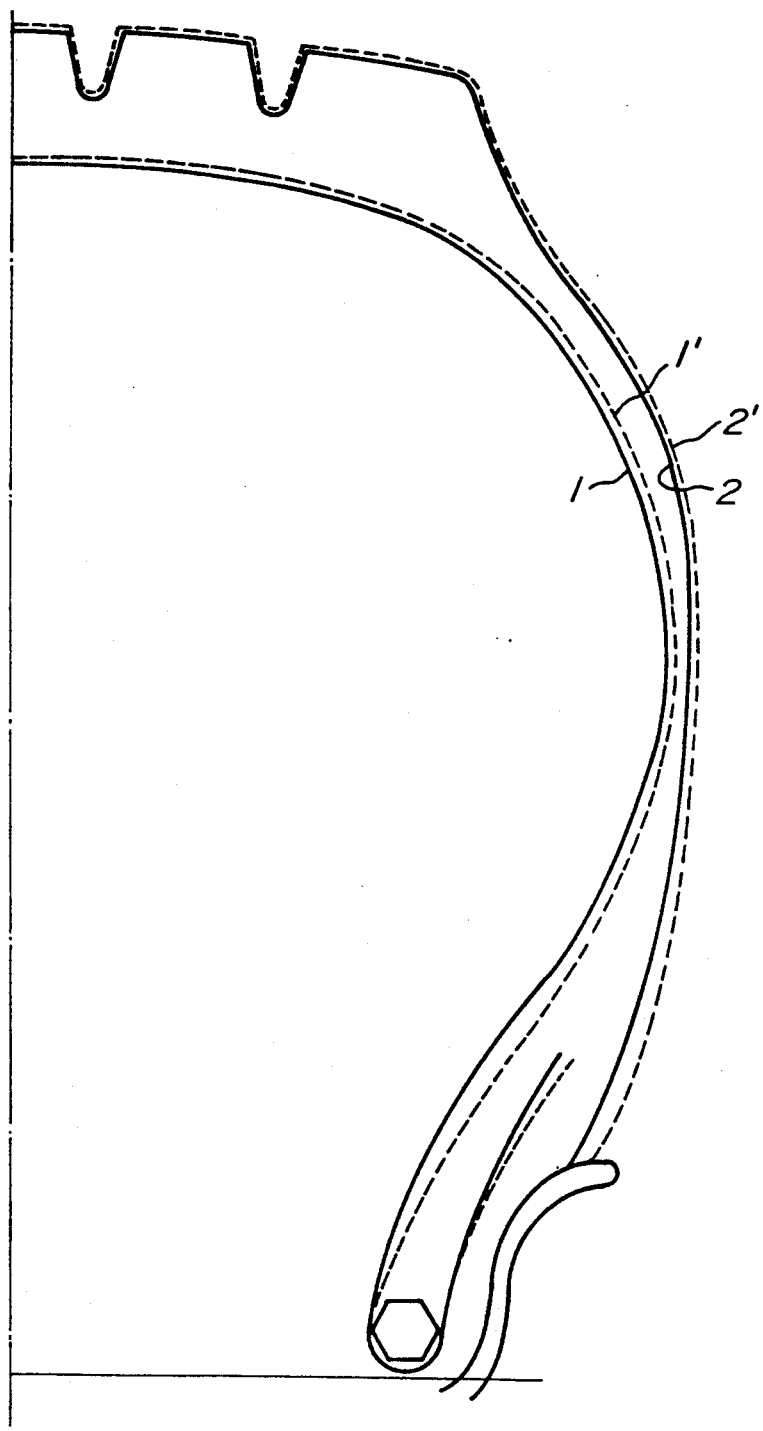
FIGS. 3 and 4 are radial cross-sections of tires of naturally equilibrium configuration of the prior art using 5° flat base and 15° drop center rims, respectively.

In FIGS. 1 and 2, solid lines illustrate carcass path lines 1 and 2 when 5% of normal inner pressure is filled and broken lines illustrate carcass path lines 1' and tire profiles 2' when normal inner pressure is filled. The distinctive feature of the deformed tire configuration according to the invention is clearly evident from these solid lines 1 and 2 and broken lines 1' and 2'. It is clearer in comparison with FIG. 3 illustrating a deformed status of a comparison tire formed in so-called "natural equilibrium configuration" according to the prior art.

According to the invention, a substantially uniform expansion g occurs radially outwardly of the tire on a tread 5 from one end 4 of a ground contact surface through a tread center 3 to the other end (not shown) of the ground contact surface, while a depression d occurs axially inwardly of the tire over at least part of a radially outer zone 7 of a sidewall from the end 4 of the ground contact surface to a tire maximum width position 6 after filled with the normal inner pressure. Moreover, an expansion f occurs axially outwardly of the tire over a radially inner zone of the sidewall from the tire maximum width position 6 to a point 8 where the sidewall leaves a rim flange or a parting point of the sidewall from the rim flange.

As can be seen from the drawings, we now consider one half of a tire. For example, therefore, we mentioned the sidewall as single although one tire includes two sidewalls.

There are the outward expansions at the tread portion 5 and the radially inner zone of the sidewall and the inward depression at the radially outer zone 7 in this manner when the tire is filled with the normal inner pressure according to the invention. The particular change in configuration according to the invention is accomplished by utilizing the following general properties:

(1) The tire tends to expand as a whole,
(2) The carcass configuration tends to approach a natural equilibrium configuration,
(3) If substantially inextensible cords are used for carcass cord, the carcass does not extend very well, and
(4) The deformations of the carcass by the filling of the inner pressure are caused as a chain reaction. A deformation does not occur in only one part.

In this manner, the carcass line of the tire mounted on a rim and filled with the inner pressure 5% of the normal inner pressure is located in the tread portion 5 inside the carcass line or the equilibrium configuration curve of the tire filled with the normal inner pressure. The carcass line in the radially outer zone 7 of the sidewall has a larger curvature than that of the carcass line of the equilibrium configuration curve and located outside the carcass line of the naturally equilibrium configuration of the tire when filled with the normal inner pressure. Moreover, the carcass line from the radially inward zone 9 of the sidewall to the bead portion is located considerably inside the carcass line of the equilibrium configuration curve of the tire when filled with the normal inner pressure. Further, substantially inextensible cords such as steel cords and aromatic polyamide cords are used for the carcass plies so that when filled with the normal inner pressure, the carcass line is inwardly depressed in the radially outer zone of the sidewall and in connection therewith is greatly expanded outwardly in the crown portion and the radially inner zone.

For example, in case that the radially outer zone of the sidewall is similar to the naturally equilibrium configuration, the carcass in this zone is expanded or substantially not deformed so that the expansion required in the crown zone and the great expansion in the radially inner zone of the sidewall could not be accomplished. Therefore, the strain distribution required for the improvement of the durability could not be realized.

In practice, the particular change in configuration can be easily obtained by ensuring the configuration of the carcass when the tire mounted on a rim is filled with 5% of the normal inner pressure on the basis of limitations of the present invention as explained hereinafter.

The carcass configurations when tires are filled with inner pressure 5% of the normal inner pressure are defined separately on the tires of a tube type to be mounted on 5° flat base rims whose bead seats engaging bead portions of the tires make approximately 5° with rotating axes of the tires and tires of tubeless type to be mounted on 15° drop center rims whose bead seat make approximately 15° with rotating axes of the tires, respectively, because lengths of flanges of the rims of the two kinds are different in radial directions so that distances from the rotating axes of the tires to respective reference points of the tires are different.

With a heavy duty radial tire mounted on a rim having a bead seat inclined at a degree of 5° relative to a rotating axis of the tire, according to the invention, a carcass profile in the radial cross-sections of the tire mounted on the approved rim and filled with an inner pressure 5% of the normal inner pressure and under no load condition is a composite curve smoothly passing through points B, A and D, where the point A is an intersection of a carcass line C of the carcass profile with a tangent mm' in a radial direction to the carcass line at a carcass line maximum width position and the points B and D are intersections of the carcass line C and a perpendicular pp' to a bead base line RL. the perpendicular pp' spaced apart axially outwardly from an equatorial plane M of the tire by a distance of 0.45 times a rim width W corresponding to a distance between flanges of the rim, and the carcass profile fulfills three relations, a first relation $5 < 240/H \times u < 35$, where u is a distance from the point A to a point E, where the point E is a point of contact where said tangent mm' contacts an equilibrium configuration curve N passing through the points B and D, and H is a maximum height of the carcass line C from the bead base line RL, a second relation $5.0 < 240/H \times S < 13.0$, where S is a maximum distance of the carcass line C spaced inwardly from the equilibrium configuration curve N in the radial inner zone of the sidewall, and a third relation $2.0 < 240/H \times t < 10.0$, where t is a maximum distance of the carcass line C spaced outwardly from the equilibrium configuration curve N in the radial outer zone of the sidewall.

As illustrated in FIG. 1, a carcass configuration in a radially inner zone of the sidewall, located between a point n where the carcass inflated line intersects with a line perpendicular to that inflated line extending from the tire maximum width position 6 and a bottom end point n' where the carcass inflated line intersects with a line perpendicular to that inflated line extending from a parting point of a tire surface from a flange of the rim, is either a straight line or a curved line having a center of curvature inside the tire when the tire is filled to 5% of normal inflation pressure.

With a heavy duty radial tire mounted on a rim having a bead seat inclined at a degree of 15° relative to a rotating axis of the tire, according to the invention, a carcass profile in the radial cross-sections of the tire mounted on the approved rim and filled with an inner pressure 5% of the normal inner pressure and under no load condition is a composite curve smoothly passing through points B, A and D. The point A is a point of contact of a carcass line C of the carcass profile with a tangent mm' in a radial direction to the carcass line at a carcass line maximum width position. The points B and D are intersections of the carcass line C and a perpendicular pp' to a bead base line RL, said perpendicular pp' spaced apart axially outwardly from an equatorial plane M of the tire by a distance of 0.45 times a rim width W corresponding to a distance between flanges of the rim. The carcass profile fulfills three relations first $5 < 210/H \times u < 25$, where u is a distance from the point A to a point E, where the point E is a point of contact where said tangent mm' contacts an equilibrium configuration curve N passing through the points B and D, and H is a maximum height of the carcass line C from the bead base line RL, second relation $3.0 < 210/H \times S < 9.0$, where S is a maximum distance of the carcass line C spaced inwardly from the equilibrium configuration curve N in the radial inner zone of the sidewall, and third $1.0 < 210/H \times t < 5.0$, where t is a maximum distance of the carcass line C spaced outwardly from the equilibrium configuration curve N in the radial outer zone of the sidewall.

The equilibrium configuration curve N is indicated by the following equation following to the so-called "equilibrium configuration theory".

$$\cos \psi = \frac{R^2 - R_E^2}{R_S^2 - R_E^2}$$

where $\psi$ is an angle made by a tangent on a profile line of a carcass and a line parallel to the rotating axis of the tire and located at a distance R from the rotating axis, $R_E$ is a distance from the rotating axis to a point E where the profile line of the carcass has the maximum width in a direction of the rotating axis, and $R_S$ is a distance from the rotating axis to a point S where a tangent to an extension of the equilibrium profile line becomes parallel to the rotating axis of the tire.

Figure 5:
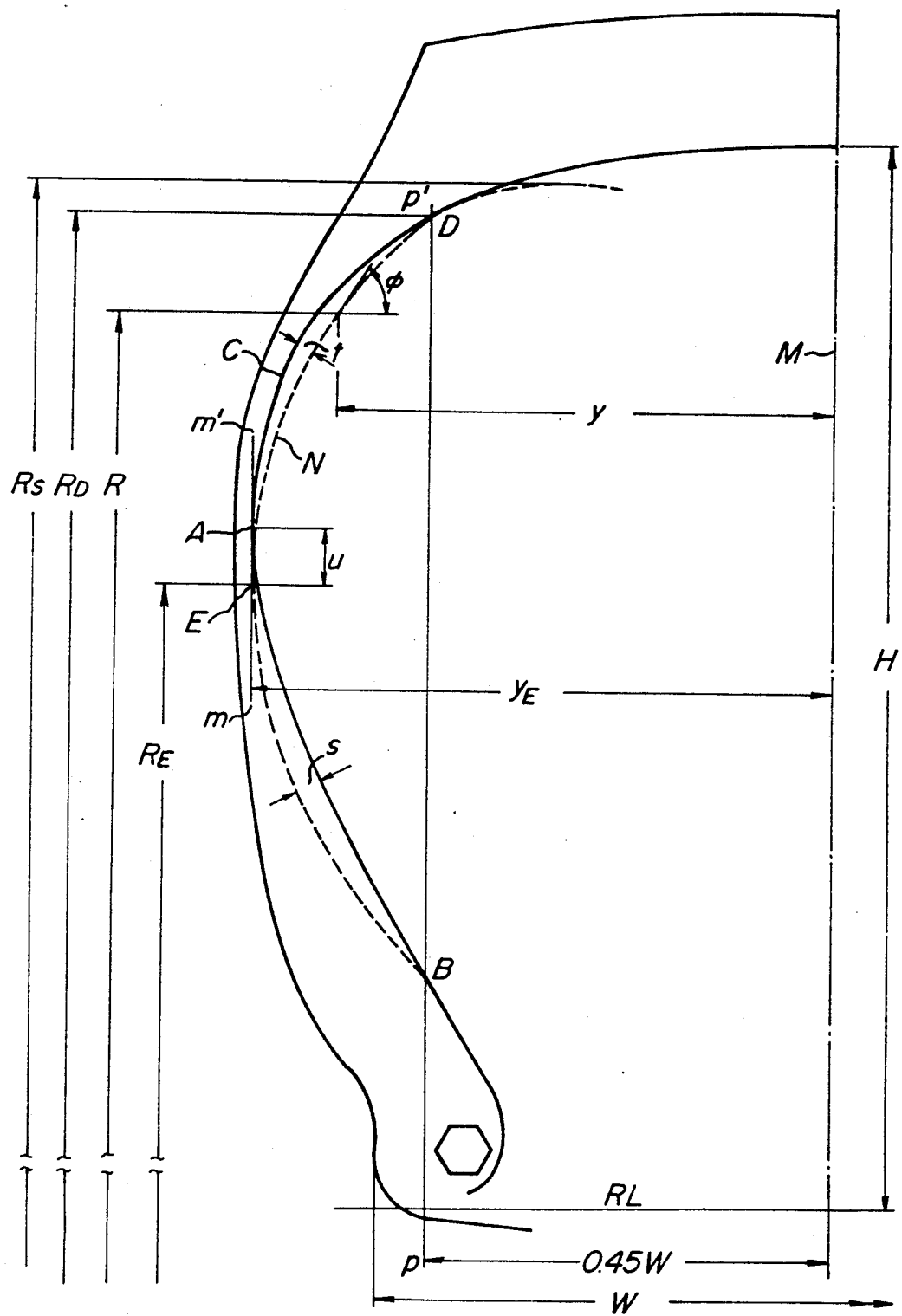
FIGS. 5 and 6 are radial cross-sections for explaining the naturally equilibrium configuration of the tire.
Figure 6:
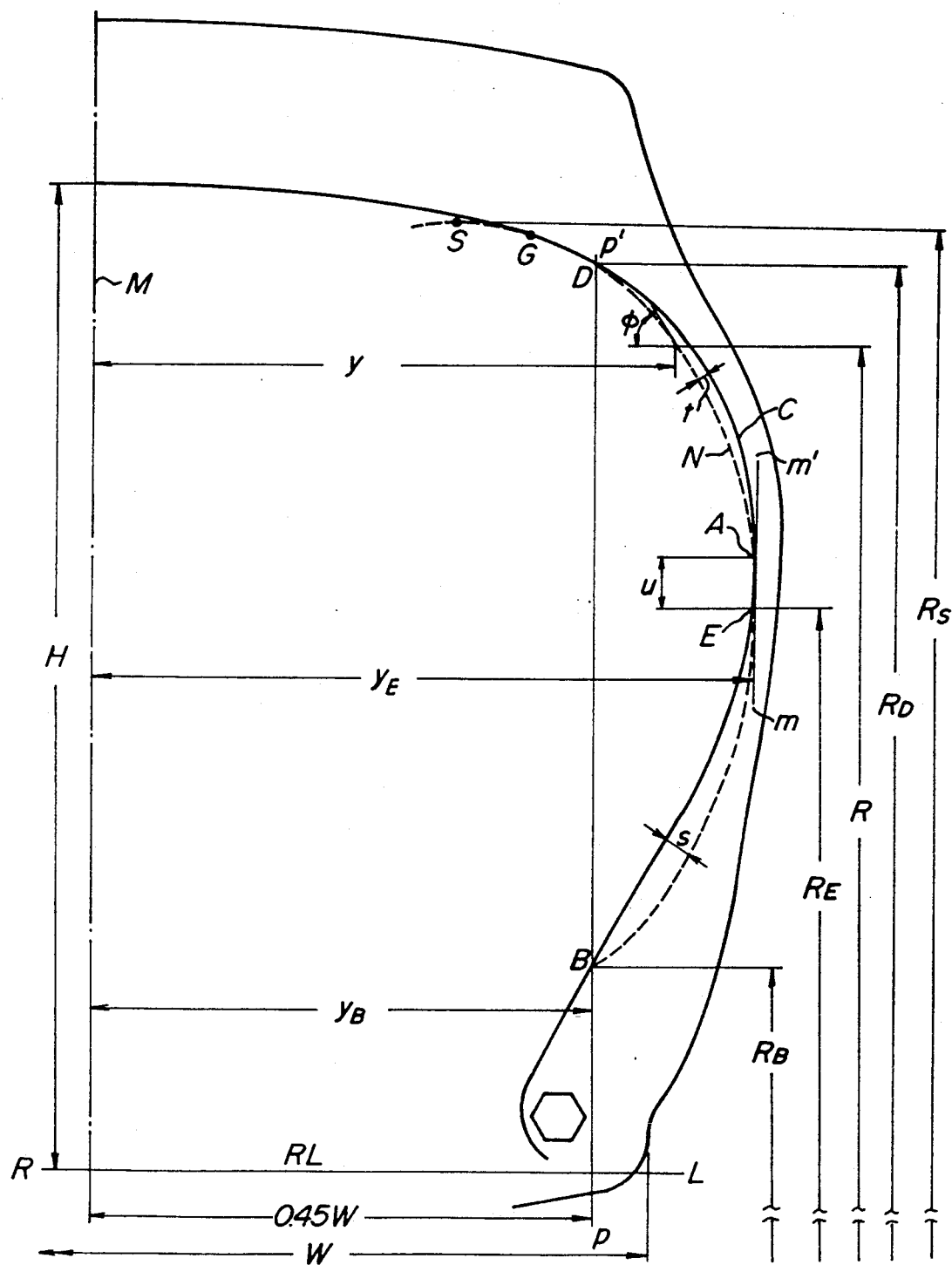

An equilibrium profile line of the carcass passing through the carcass maximum width Point E, points B and D and the tangent mm' (determined by the standard or the like) is shown in broken lines in FIGS. 5 and 6 as a reference line. In this case, the point B is located at a distance of 0.15 H to 0.30 H from the rotating axis and the point D is at a distance of 0.82 H to 0.98 H.

The distance HE, illustrated in FIG. 1 from the turn-up end of the carcass ply is 10–35% of a maximum tire height SH measured from a bead base line when the tire is filled to its normal inflation pressure.

Figure 7:
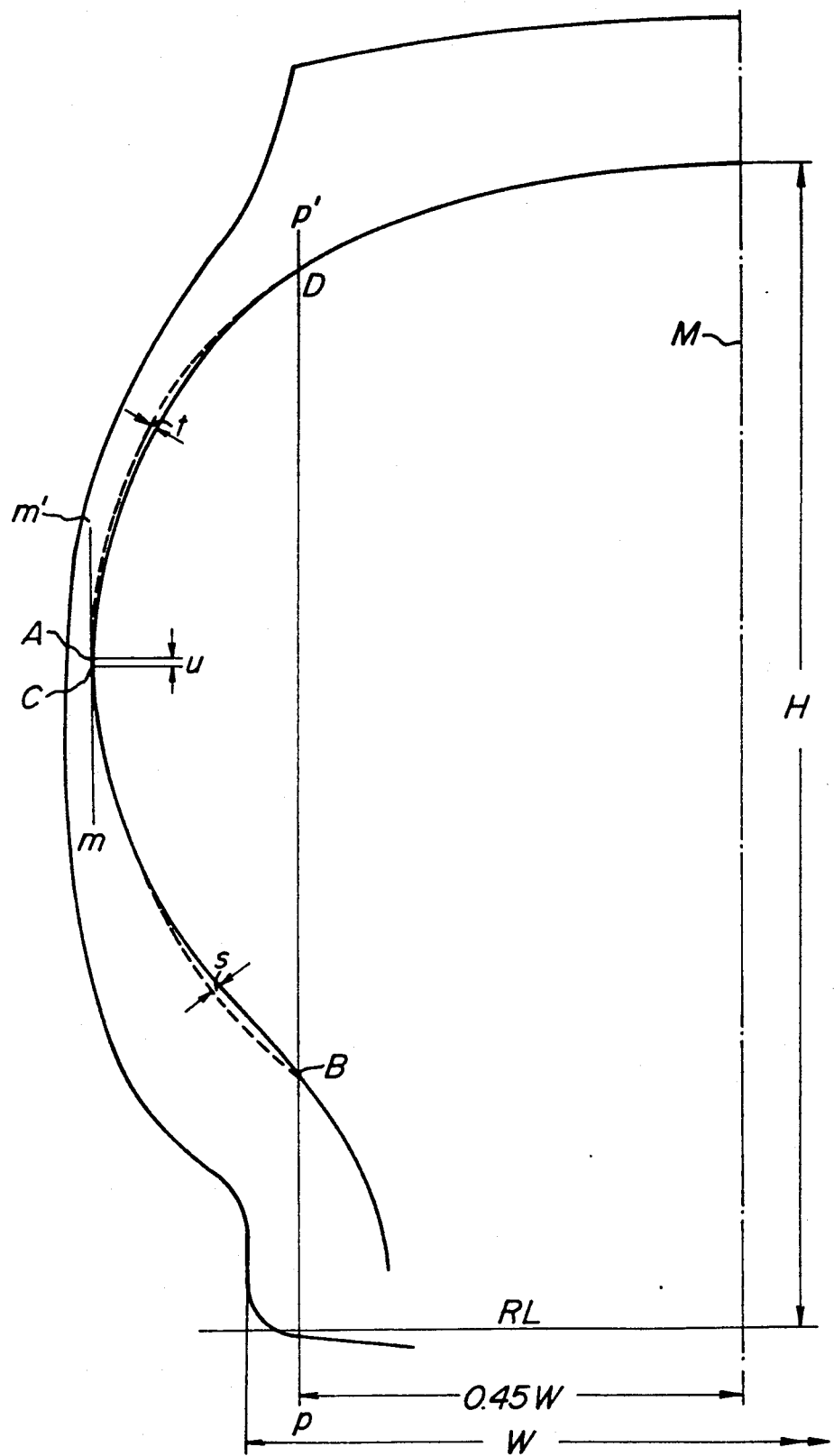
FIGS. 7 and 8 are radial cross-sections of tires of naturally equilibrium configuration.
Figure 8:
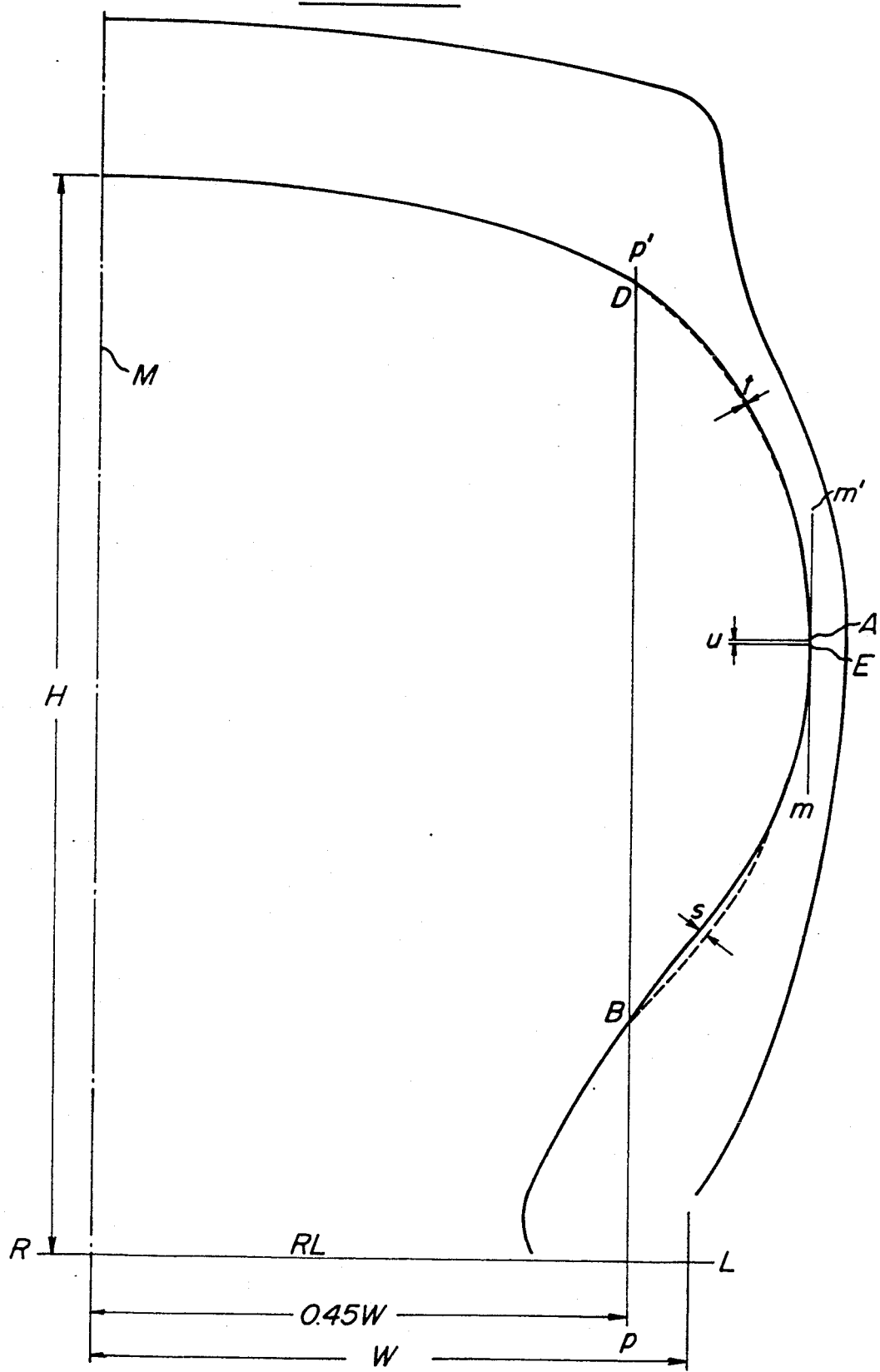

FIGS. 7 and 8 illustrates carcass profiles in solid lines in radial cross-sections and equilibrium configuration curves of carcass in broken lines which pass through points B and D and contacts tangents of the carcass lines, when tires of the naturally equilibrium configurations of the prior art mounted on rims are filed with the inner pressure 5% of the normal inner pressure, which are tube and tubeless tires, respectively. The solid and broken lines are substantially coincident with each other and therefore it is clear that the tires of the prior art are designed on the basis of the equilibrium configuration curves.

Referring to FIG. 5, according to the invention with a tire using a 5° flat base rim, a carcass line passes outside the line N of the equilibrium configuration in a radially outer zone of a sidewall within a range of $2.0 < 240/H \times t < 10.0$, where t is the maximum deviation from the line N of the equilibrium configuration. In the radially outer zone of the sidewall, moreover, in order to obtain a larger curvature, a carcass profile maximum width point A, where a width of the carcass profile in the direction of the rotating axis of the tire is maximum, is located radially outwardly of a carcass profile maximum width point E of the equilibrium configuration by a distance u between the points A and E within a range of $5.0 < 240/H \times u < 35$. With this arrangement, it is possible to realize the sufficient outward expansion in the crown portion and the radially inner zones of the sidewalls and the sufficient inward depression in the radially outer zones of the sidewalls according to the invention when the tire is filled with the normal inner pressure. In the radially inner zone of the sidewall, furthermore, the maximum deviation s of the carcass profile from the line N of the equilibrium configuration is within a range of $5.0 < 240/H \times S < 13.0$ according to the invention. This feature brings about a configuration tending to approach the equilibrium configuration when filled with the normal inner pressure in conjunction with the feature of the carcass line passing inside the equilibrium configuration, thereby improving the durability of the tire.

Referring to FIG. 6 with a tire using a 15° drop center rim, according to the invention, a carcass line passes outside the line N of the equilibrium configuration in a radially outer zone of a sidewall within a range of $1.0 < 210/H \times t < 5.0$ where t is the maximum deviation from the line N of the equilibrium configuration. In the radial outer zone of the sidewall, moreover, in order to obtain a larger curvature, a carcass profile maximum width point A is located radially outwardly of a carcass profile maximum width point E of the equilibrium configuration by a distance u between the points A and E within a range of $5.0 < 210/H \times u < 25$. In this manner, it is possible to realize the sufficient outward expansion in the crown portion and the radially inner zone of the sidewall when filled with the normal inner pressure. In the radially inner zone of the sidewall, moreover, the maximum deviation s of the carcass profile from the line N of the equilibrium configuration is within a range of $3.0 < 210/H \times S < 9.0$ according to the invention. This feature brings about a configuration tending to approach the equilibrium configuration when filled with the normal inner pressure in conjunction with the feature or the carcass line passing inside the equilibrium configuration, thereby improving the durability of the tire.

With values of the t, s and u smaller than their minimum values, the sufficient change in configuration could not be obtained when filled with the normal inner pressure, so that the durability could not be improved. On the other hand, with values of the t, s and u larger than their maximum values, a deformation when filled with the normal inner pressure becomes excessive to increase shearing strains at ends of plies so that the durability of the tire lowers.

With a heavy duty radial tire mounted on a rim having a bead base engaging said bead portions, said bead seat inclined at a degree of 5° relative to a rotating axis of the tire, according to the invention, a carcass profile in the radial cross-sections of the tire mounted on the approved rim and filled with an inner pressure 5% of the normal inner pressure and under no load condition is a composite curve smoothly passing through points F, A and G, where the point A is a point of contact of a carcass line C of the carcass profile with a tangent mm' in a radial direction to the carcass line at a carcass line maximum width position and the points F and G are intersections of the carcass line C and a perpendicular ll' to a bead base line RL, the perpendicular ll' spaced apart axially outwardly from an equatorial plane M of the tire by a distance of 0.5 times a rim width corresponding to a distance between flanges of the rim, and the carcass profile fulfills three relations, a first relation $0 < 240/H \times v < 3.5$, where v is a maximum distance of the carcass line C spaced outwardly of a segment of line $\overline{FI}$ connecting the points F and I, where the point I is an intersection of the tangent mm' and a straight line jj' which is in parallel with a rotating axis of the tire and spaced from the bead base line RL by a distance LH of 0.55 times H, where H is a maximum height of the carcass line C from the bead base line RL, a second relation $4.0 < 240/H \times w < 9.5$, where w is a maximum distance of the carcass line C spaced outwardly of an arc GI passing through the point G contacting and tangent to the tangent mm' at the point I, and a third relation $15 < 240/H \times x < 35$, where x is a distance between the points A and I.

With a heavy duty radial tire mounted on a rim having a bead seat inclined at a degree of 15° relative to a rotating axis of the tire, according to the invention, a carcass profile in the radial cross-sections of the tire mounted on the approved rim whose and filled with an inner pressure 5% of the normal inner pressure and under no load condition is a composite curve smoothly passing through points F, A and G, where the point A is a point of contact of a carcass line C of the carcass profile and a tangent mm' in a radial direction to the carcass line at a carcass line maximum width position and the points F and G are intersections of the carcass line C and a perpendicular ll' to a bead base line RL, the perpendicular ll' spaced apart axially outwardly from an equatorial plane M of the tire by a distance of 0.5 times a rim width corresponding to a distance between flanges of the rim, and the carcass profile fulfills three relations, first $0 < 210/H \times v < 5.0$, where v is a maximum distance of the carcass line C spaced outwardly of a segment of line $\overline{FI}$ connecting the points F and I, where the point I is an intersection of the tangent mm' and a straight line jj' which is in parallel with a rotating axis of the tire and spaced from the bead base line RL by a distance LH of 0.55 times H, where H is a maximum height of the carcass line C from the bead base line RL, second $2.0 < 210/H \times w < 8.0$, where w is a maximum distance of the carcass line C spaced outwardly of an arc GI passing through the point G contacting and tangent to the tangent mm' at the point I, and third $6.0 < 210/H \times x < 30.0$, where x is a distance between the points A and I.

Figure 9:
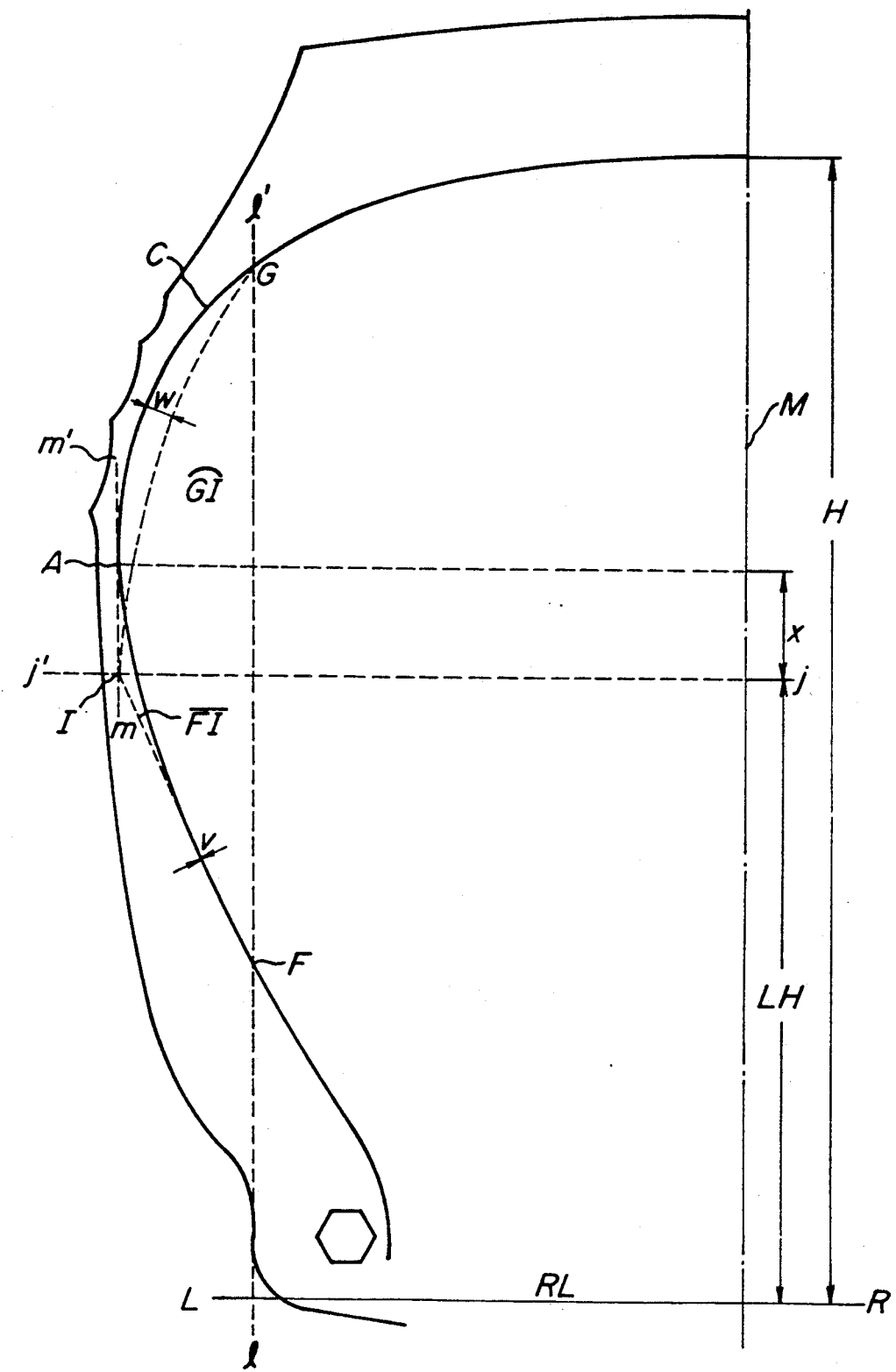
FIGS. 9 and 10 are radial cross-sections of preferred embodiments of tires according to the invention.
Figure 10:
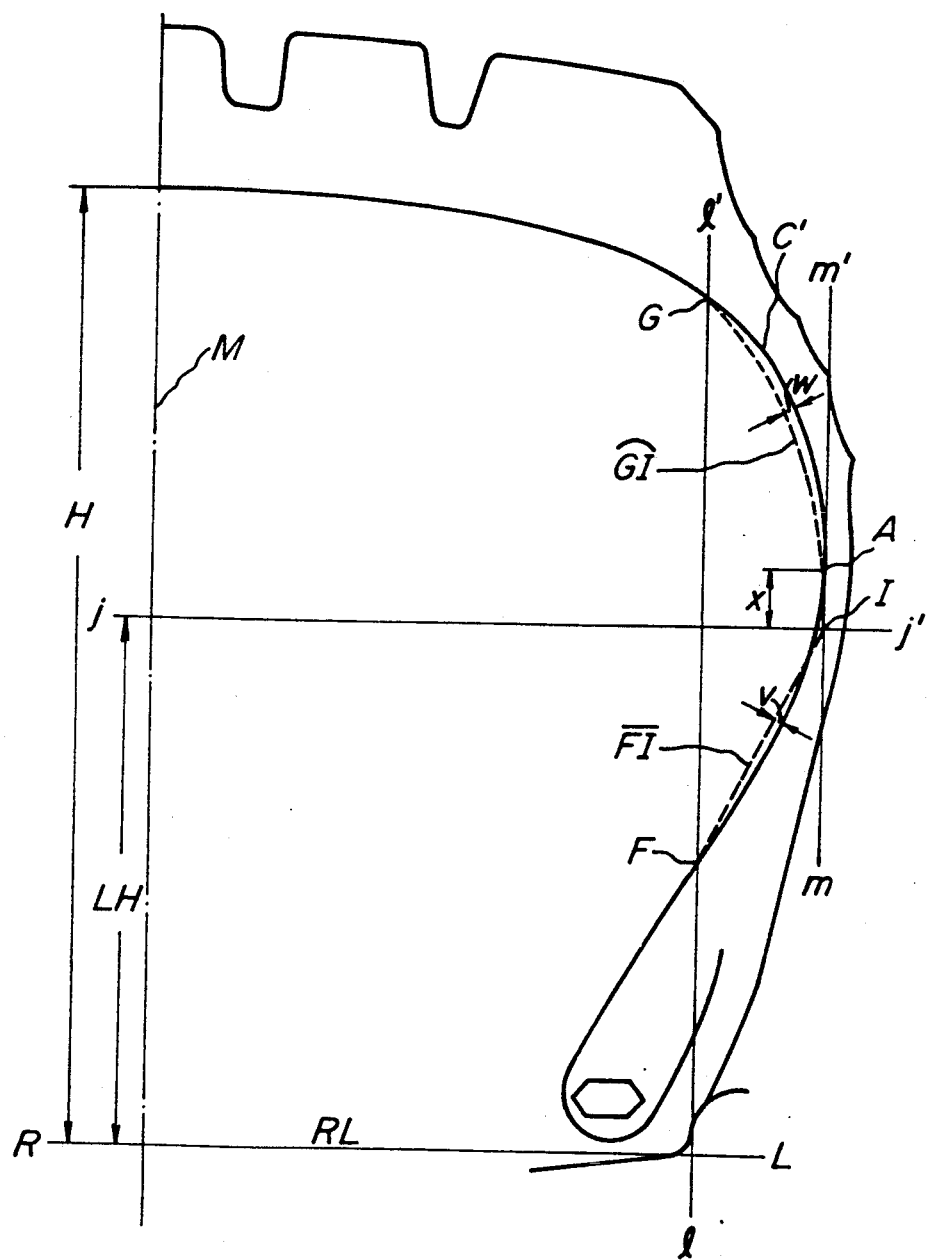
Figure 11:
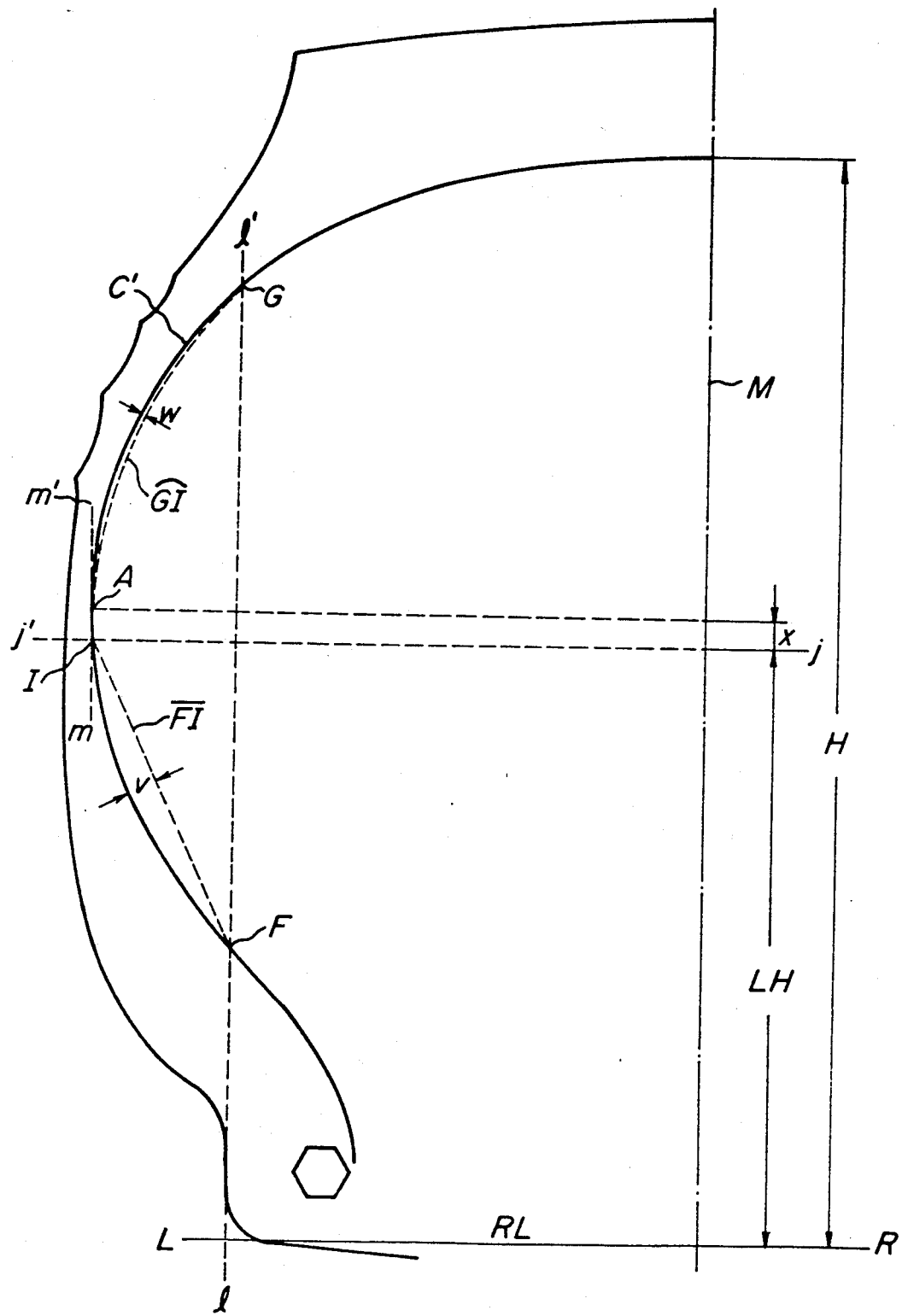
FIGS. 11 and 12 are radial cross-sections of tires of the prior art.
Figure 12:
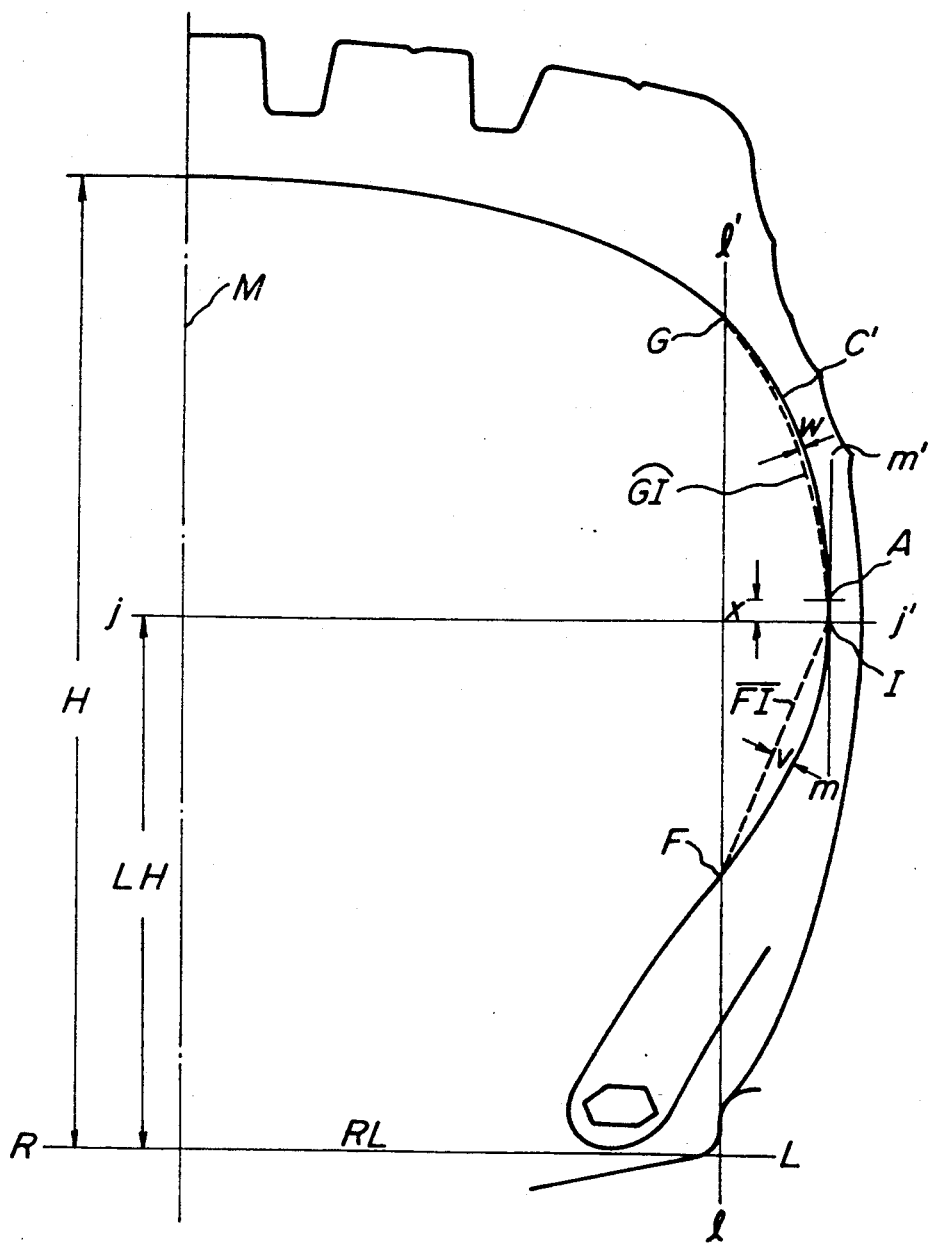

FIGS. 9 and 10 illustrate carcass lines of tires of preferable embodiments of the invention in section using 5° flat base rim and 15° drop center rim, respectively. On the other hand, FIGS. 11 and 12 illustrate tires of the equilibrium configuration of the prior art the same in size as those shown in FIGS. 9 and 10. In FIGS. 11 and 12, a difference between the carcass line of the tire of the prior art and an arc GI is small so that the arc GI substantially indicates the carcass profile of the tire of the prior art. On the other hand, the carcass profile is greatly deviated from a straight line FI in the zone from the radially inner area of the sidewall to a bead portion as shown in FIGS. 11 and 12 illustrating tires of the prior art.

In contrast herewith, according to the embodiment of the invention a carcass line of a tire using a 5° flat base rim is deviated in the radially outer zone of the sidewall outwardly from a reference line (arc $\overline{GI}$) indicating the carcass line of the tire of the prior art by a distance within a range of $4.0 < 240/H \times w < 9.5$ as shown in FIG. 9. A carcass line of a tire using a 15° drop center rim is deviated outwardly from the arc GI by a distance within a range of $2.0 < 210/H \times w < 8.0$ as shown in FIG. 10.

In order to deform the carcass in the radially inner zone of the sidewall selectively and greatly outwardly when filled with the normal inner pressure, it is necessary to arrange the carcass line in this zone inside the line of the naturally equilibrium configuration. According to the invention, therefore, the carcass line of a tire using a 5° flat base rim in the radially inner zone of the sidewall is preferably located inwardly of the straight line FI by a distance v within a range of $0 < 240/H \times v < 3.5$. The carcass line of a tire using a 15° drop center rim is preferably located inwardly of the straight line FI by a distance v within a range of $0 < 210/H \times v < 5.0$. Moreover, with the tire using the 5° flat base rim, a carcass maximum width point A is preferably located radially outwardly from the standard intersection point I by a distance x within a range of $15 < 240/H \times x < 30$. With the tire using the 15° drop center rim, a carcass maximum width point A is preferably located radially outwardly from the point i by a distance x within a range of $6.0 < 210/H \times x < 30.0$. The purpose of this feature is to obtain a curvature of the carcass line in the radially outer zone larger than that in the tire of the prior art.

With values of the w and x smaller than their minimum values and values of the v larger than its maximum value, the sufficient change in configuration could not be obtained as described later when filled with the normal inner pressure. On the other hand, with values of the w and x larger than their maximum values, a deformation when filled with the normal inner pressure becomes excessive to increase shearing strains so that the durability of the tire rather lowers.

With a heavy duty radial tire mounted on a rim having a bead seat inclined at a degree of 5° relative to a rotating axis of the tire, according to the ivenntion, a carcass profile in the radial cross-sections of the tire mounted on the approved rim and filled with an inner pressure 5% of the normal inner pressure and under no load condition is a composite curve smoothly passing through points R, A and G. The point A is a point of contact of a carcass line C of the carcass profile with a tangent mm′ in a radial direction to the carcass line at a carcass line maximum width position. The point R is an intersection of the carcass line C and a straight line kk′ in parallel with and spaced from a bead base line RL by a distance MH of 0.3 times a maximum height H of the carcass line C from the bead base line RL. The point G is an intersection of the carcass line C and a perpendicular ll′ to a bead base line RL, the perpendicular ll′ spaced apart axially outwardly from an equatorial plane M of the tire by a distance of 0.5 times a rim width corresponding to a distance between flanges of the rim. The carcass profile fulfills three relations. A first relation is $6.0 < 210/H \times y < 11.5$, where y is a maximum distance of the carcass line C from an arc IR which passes through the point R and contacts the said tangent mm′ at a point I, where the point I is an intersection of the tangent mm′ and a straight line jj′ which is in parallel with a rotating axis of the tire and spaced radially outwardly from the bead base line RL by a distance LH 0.55 times the maximum height H of the carcass line C, a second relation $4.0 < 210/H \times w < 9.5$, where w is a maximum distance of the carcass line C from an arc $\widehat{GI}$ which passes through the point G and contacts the tangent mm′ at the point I. A third relation $15 < 210/H \times x < 35$, where x is a radially outward distance between the points A and I.

With a heavy duty radial tire mounted on a rim having a bead seat inclined at a degree of 15° relative to a rotating axis of the tire, according to a carcass profile in the radial cross-sections of the tire mounted on the approved rim and filled with an inner pressure 5% of the normal inner pressure and under no load condition is a composite curve smoothly passing through points R, A and G. The point A is a point of contact of a carcass line C of the carcass profile and a tangent mm′ in a radial direction to the carcass line at a carcass line maximum width position. The point R is an intersection of the carcass line C and a straight line kk′ in parallel with and spaced from a bead base line RL by a distance LH of 0.3 times a maximum height H of the carcass line C from the bead base line RL. The point G is an intersection of the carcass line C and a perpendicular ll′ to a bead base line RL, the perpendicular ll′ spaced apart axially outwardly from an equatorial plane M of the tire by a distance of 0.5 times a rim width corresponding to a distance between flanges of the rim. The carcass profile fulfills three relations, a first relation $3.0 < 210/H \times y < 8.0$, where y is a maximum distance of the carcass line C from an arc $\widehat{IR}$ which passes through the point R and contacts the tangent mm′ at a point I, where the point I is an intersection of the tangent mm′ and a straight line jj′ which is in parallel with a rotating axis of the tire and spaced radially outwardly from the bead base line RL by a distance LH 0.55 times the maximum height H of the carcass line C. A second relation is $2.0 < 210/H \times w < 8.0$, where w is a maximum distance of the carcass line C from an arc GI which passes through the point G and contacts the tangent mm′ at the point I. A third relation is $6.0 < 210/H \times x < 30.0$, where x is a radially outward distance between the points A and I.

Figure 13:
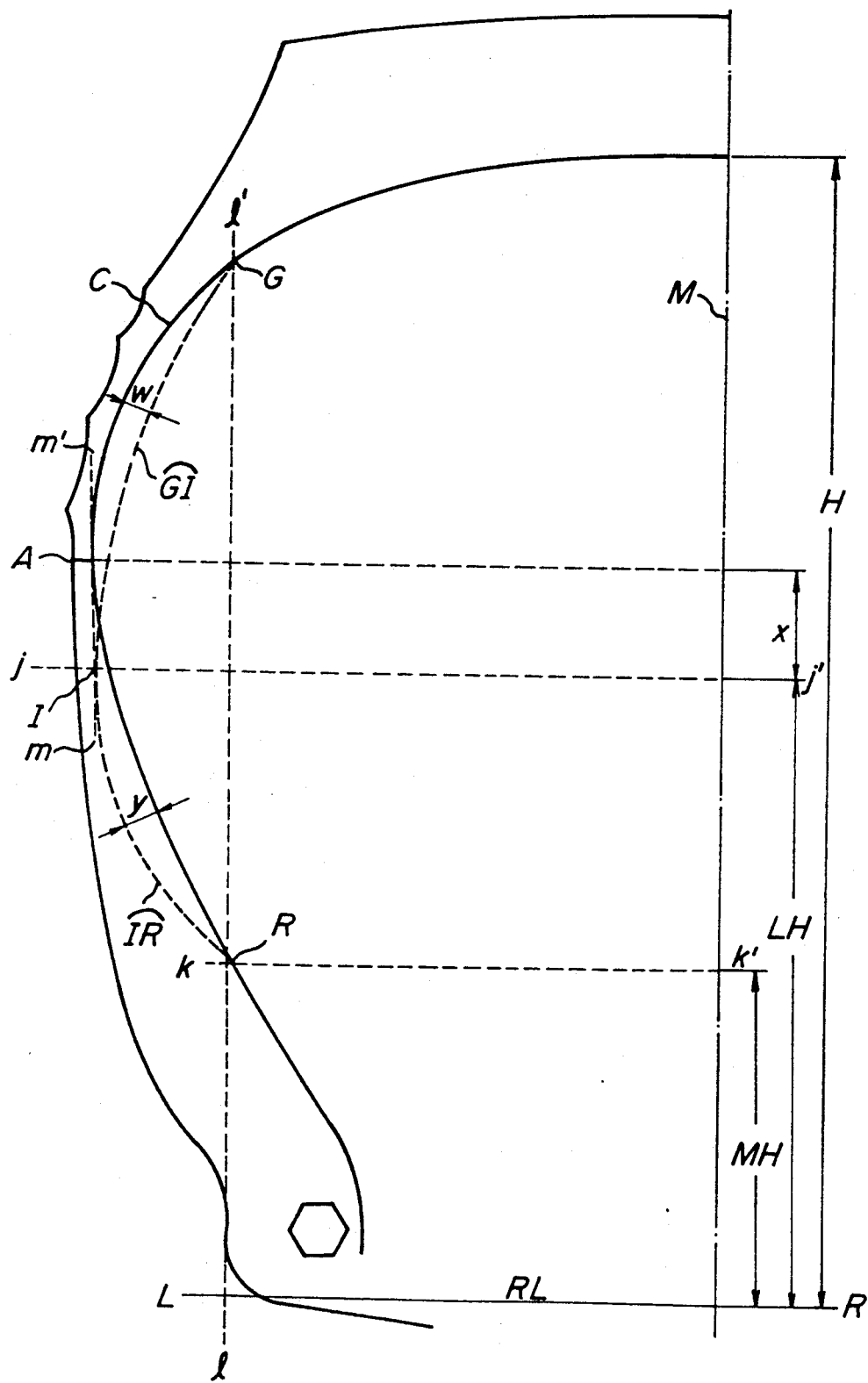
FIGS. 13 and 14 are radial cross-sections of other embodiments of tires according to the invention.
Figure 14:
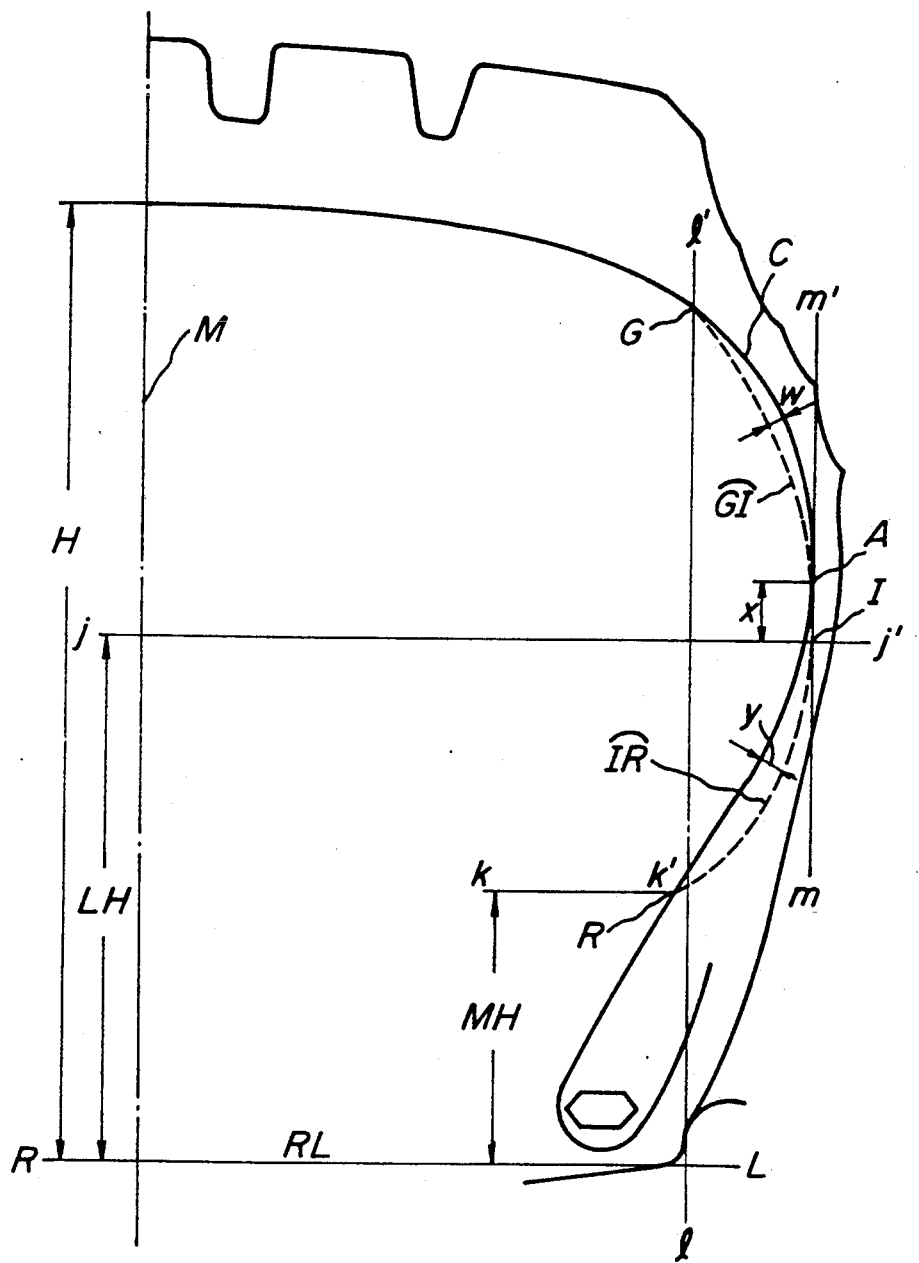

FIGS. 13 and 14 illustrate carcass lines of tires of further preferable embodiments of the invention in section using 5° flat base rim and 15° drop center rim, respectively. FIGS. 15 and 16 illustrate tires of the equilibrium configuration of the prior art of the same in size as those shown in FIGS. 13 and 14. In FIGS. 15 and 16, a difference between the carcass line of the tire of the prior art and an arc GI is small so that the arc GI substantially indicates the carcass profile of the tire of the prior art. Moreover, the carcass profile is greatly deviated from a straight line IR in comparison with those shown in FIGS. 1 and 4.

In order to deform the carcass in the radially inner zone of the sidewall selectively and greatly outwardly when filled with the normal inner pressure, it is necessary to arrange the carcass line in this zone inside an arc $\widehat{IR}$. According to the invention, therefore, the carcass line of a tire using a 5° flat base rim in the radially inner zone of the sidewall is preferably located inwardly of the arc IR by a distance y within a range of $6.0 < 210/H \times y < 11.5$. The carcass line of a tire using a 15° drop center rim is preferably located inwardly of the arc $\widehat{IR}$ by a distance y within a range of $3.0 < 210/H \times y < 8.0$.

In general, most failures of a tire occur at ends of a carcass or bead portions.

In order to eliminate the failures at the ends of the carcass ply, appropriate compression stresses are applied to the ends of the carcass ply to prevent the failures at the ends of the carcass ply so as to improve the durability of the bead portions.

In more detail, when the expansion f in the radially inner zone of the sidewall is caused axially outwardly by filling with the normal inner pressure, the proximity of the end e of the carcass ply within a zone of ±10-20 mm is extended radially inwardly as well as axially outwardly as shown in broken lines in FIG. 17, so that the application of the compression force to the end of the carcass ply is realized.

In order to apply an appropriate compression force, moreover, it is preferable that a center of radius of curvature of the carcass line in the radially inner zone of the sidewall is inside of the tire or the carcass line is similar to a straight line.

The tensile force in the belt is increased by expanding the crown zone or more particularly the part from an equatorial line to the ends of the maximum ground contact width when filling with the inner pressure.

The increase of the tension of the belt greatly contributes to the improvement of the durability at the ends of the belt, because strains occurring between belt layers when a load is applied are mitigated to prevent separations at the ends of the belt.

In other words, referring to FIG. 18 illustrating a deformation of a belt caused by a load applied to the tire,, when an initial tension applied to the belt is large, a center O of the circle in a solid line is positioned higher from a center O' of the circle in a dot-and-dash line when an initial tension applied to the belt is small. Therefore, the deformation of the belt in a deformation zone R on the ground contact side is small, so that the shearing strains between belt layers whose cords extend in intersecting directions are mitigated, thereby improving the durability at ends of the belt.

The strain distribution above described is obtained by particularly linked deformations caused when filled with the normal inner pressure to achieve the improvement of the durability at the crown portion and the bead portions.

Examples of tires according to the invention and comparative examples of tires of the prior art will be explained hereinafter.

EXAMPLE 1 OF THE INVENTION

| Tire size | 10.00 R 20 |
| --- | --- |
| Rim size | 7.50 V 20 |
|  | (5° flat base rim) |
| Normal inner pressure | 7.25 kg/cm$^2$ |
| Carcass outermost height H | 240 mm |

Referring to FIG. 5, the height H is a distance from the outermost position of the carcass to a bead base line or rim diameter line (RL) which is parallel to a rotating axis of the tire and passes through a point on a normal outer diameter of the rim. In this case, the point on the normal outer diameter of the rim corresponds to a point of intersection between a surface of the rim engaging a bead base of the tire and a flange surface of the rim perpendicular to the rotating axis of the tire.

Referring to FIG. 5, tires of the Example 1 of the invention for trucks and buses were produced by way of trial, which had values $S=10.0$ mm, $t=7.8$ mm and $u=23.9$ mm with respect to its carcass line C determined by the points B and D located at distances from the line RL:53.2 mm (0.22·H) and 226 mm (0.94·H), respectively.

Moreover, these steel radial tires had values, $d=1.3$ mm, $f=6.7$ mm, $g=1.9$ mm, $h=26.5$ mm, $c=75$ mm and $HE=67.2$ mm referring to FIG. 1. In this case, s, t and u are within the following ranges.

$S$: within 5.0–13.0 from $\frac{240}{H} \times S \simeq 10.0$ $t$: within 2.0–10.0 from $\frac{240}{H} \times t \simeq 7.8$ $u$: within 5–35 from $\frac{240}{H} \times u \simeq 23.9$

COMPARATIVE EXAMPLE 1

| Tire size | 10.00 R 20 |
| --- | --- |
| Rim size | 7.50 V 20 |
|  | (5° flat base rim) |
| Normal inner pressure | 7.25 kg/cm$^2$ |
| Carcass outermost height H | 240 mm |

Referring to FIG. 7, tires of the Comparative Example 1 for trucks and buses were produced for a comparison. These tires had values $s=1.6$ mm, $t=0.3$ mm and $u=0.2$ mm with respect to its carcass line C' determined by the points B and D located at distances from the line RL:49.0 mm (0.20·H) and 224.2 mm (0.91·H), respectively. These steel radial tires had the naturally equilibrium configuration exhibiting the uniformly expanded deformations of the prior art when filled with the normal inner pressure as shown in FIG. 3. As can be seen from the following values, the carcass lines are considerably deviated from the carcass line C according to the invention.

$$\frac{210}{H} \times S \simeq 1.6 < 5.0$$

$$\frac{210}{H} \times t \simeq 0.3 < 2.0$$

$$\frac{210}{H} \times u \simeq 0.2 < 5$$

EXAMPLE 2 OF THE INVENTION

| Tire size | 7.50 R 16 |
| --- | --- |
| Rim size | 600 GS 16 |
|  | (5° flat base rim) |
| Normal inner pressure | 7.0 kg/cm$^2$ |
| Carcass outermost height H | 178 mm |

Referring to FIG. 5, tires of the Example 2 for trucks and buses were produced by way of trial, which had values $s=4.6$ mm, $t=2.8$ mm and $u=8.5$ mm with respect to its carcass line C determined by the points B and D located at distances from the line RL:41.5 mm (0.23·H) and 166 mm (0.93·H), respectively. Moreover, these steel radial tires had values, $d=0.8$ mm, $f=5.0$ mm, and $c=1.0$ mm referring to FIG. 1.

COMPARATIVE EXAMPLE 2

| Tire size | 7.50 R 16 |
| --- | --- |
| Rim size | 600 GS 16 |
|  | (5° flat base rim) |
| Normal inner pressure | 7.0 kg/cm$^2$ |
| Carcass outermost height H | 178 mm |

Referring to FIG. 7, tires of the Comparative Example 2 for trucks and buses had values $s=1.2$ mm, $t=0$ mm and $u=0.5$ mm with respect to its carcass line C' determined by the points B and D located at distances from the line RL:40.2 mm (0.23·H) and 161.5 mm (0.91·H), respectively. These tires were steel radial tires of the naturally equilibrium configuration of the prior art when filled with the normal inner pressure as shown in FIG. 3.

EXAMPLE 3 OF THE INVENTION

| | |
|---|---|
| Tire size | 10.00 R 20 |
| Rim size | 7.50 V 20 |
| | (5° flat base rim) |
| Normal inner pressure | 7.25 kg/cm² |
| Carcass outermost height H | 241 mm |

Steel radial tires for trucks and buses of the Example 3 of invention were produced for trial, which had values s=7.0 mm, t=5.9 mm and u=16.7 mm with respect to its carcass line C determined by the points B and D located at distances from the line RL:50 mm (0.21·H) and 229.7 mm (0.95·H), respectively, by referring to FIG. 5 and had values, d=1.5 mm, f=5.0 mm, and e=1.8 mm referring to FIG. 1.

COMPARATIVE EXAMPLE 3

| | |
|---|---|
| Tire size | 10.00 R 20 |
| Rim size | 7.50 V 20 |
| | (5° flat base rim) |
| Normal inner pressure | 7.25 kg/cm² |
| Carcass outermost height H | 240 |

Tires of the Comparative Example 3 were produced for comparison, which were steel radial tires for trucks and buses having the naturally equilibrium configuration when filled with the normal inner pressure as shown in FIG. 3, and having values, s=3.0 mm, t=0.9 mm and u=2.5 mm with respect to its carcass line C' determined by the points B and D located at distances from the line RL:48.7 mm (0.20·H) and 226.0 mm (0.94·H), respectively, by referring to FIG. 7.

Distributions of tensions in belts in radial cross-sections of the tires of the Example 1 of the invention and the Comparison Example 1 of the prior art were obtained by the finite-element method, results of which are shown in FIG. 9. The respective tires have four belt layers in the order of first, second, third and fourth layers from the radially inner to radially outer side. The distributions of the tension of the second and third layers are shown in FIG. 19. In this case, the distributions of the tension were analyzed under no load when the normal inner pressure was filled.

As can be seen from FIG. 19, the circumferential tension in the tire according to the invention is larger than that in the tire of the Comparative Examples. This holds true in the relations between the Examples 2 and 3 of the invention and the Comparative Examples 2 and 3.

Comparative tests were carried out to determine the effect of the increase in tension of the belts on the durability of ends of the belts by a slip angled drum test wherein a tire arranged with a slip angle relative to a drum in contact with a tread of the tire was driven by the drum. The tires were driven at a speed of 60 km/hr with a slip angle 3° with the normal inner pressure under twice the normal load.

As results of the test, when tires of the Examples 1, 2 and 3 of the invention had run ran 895 km, 802 km and 840 km, slight separations occurred at ends of belts. On the other hand, separations occurred at ends of belts when the tires of the Comparative Examples 1, 2 and 3 had run 630 km, 625 km and 592 km, respectively.

Moreover, these tires were tested with a drum testing machine for examining the durability at bead portions.

These tires were driven at 60 km/hr with the normal inner pressure under twice the normal load.

As results of the test, after the tires of the Example 1 of the invention had run 20,000 km, any failures did not occur, but slight separations occurred at ends of plies when the tires of the Examples 2 and 3 had run 19,800 km and 19,500 km, respectively.

Separations occurred when the tires of the Comparative Examples 1, 2 and 3 had run 14,500 km, 14,550 km and 15,000 km.

EXAMPLE 4 OF THE INVENTION

| | |
|---|---|
| Tire size | 11/70 R 22.5 |
| Rim size | 8.25 × 22.5 |
| | (15° drop center rim) |
| Normal inner pressure | 8.0 kg/cm² |
| Carcass outermost height H | 166 mm |

Steel radial tires for trucks and buses of the Example 4 of invention were produced for trial, which had values s=5.8 mm, t=1.7 mm and u=9.0 mm with respect to its carcass line C determined by the points B and D located at distances from the line RL:30.5 mm (0.18·H) and 157.2 mm (0.94·H), respectively, by referring to FIG. 6 and had values, d=1.1 mm, f=4.2 mm, g=1.7 mm, h=13.2 mm, c=41 mm and HE=19 mm referring to FIG. 2. In this case, s, t and u are within the following ranges.

$$S: \text{within } 3.0 - 9.0 \text{ from } \frac{240}{H} \times S \simeq 6.17$$

$$t: \text{within } 1.0 - 5.0 \text{ from } \frac{240}{H} \times t \simeq 1.81$$

$$u: \text{within } 5 - 25 \text{ from } \frac{240}{H} \times u \simeq 9.57$$

COMPARATIVE EXAMPLE 4

| | |
|---|---|
| Tire size | 11/70 R 22.5 |
| Rim size | 8.25 × 22.5 |
| | (15° drop center rim) |
| Normal inner pressure | 8.0 kg/cm² |
| Carcass outermost height H | 166 mm |

Figure 4:
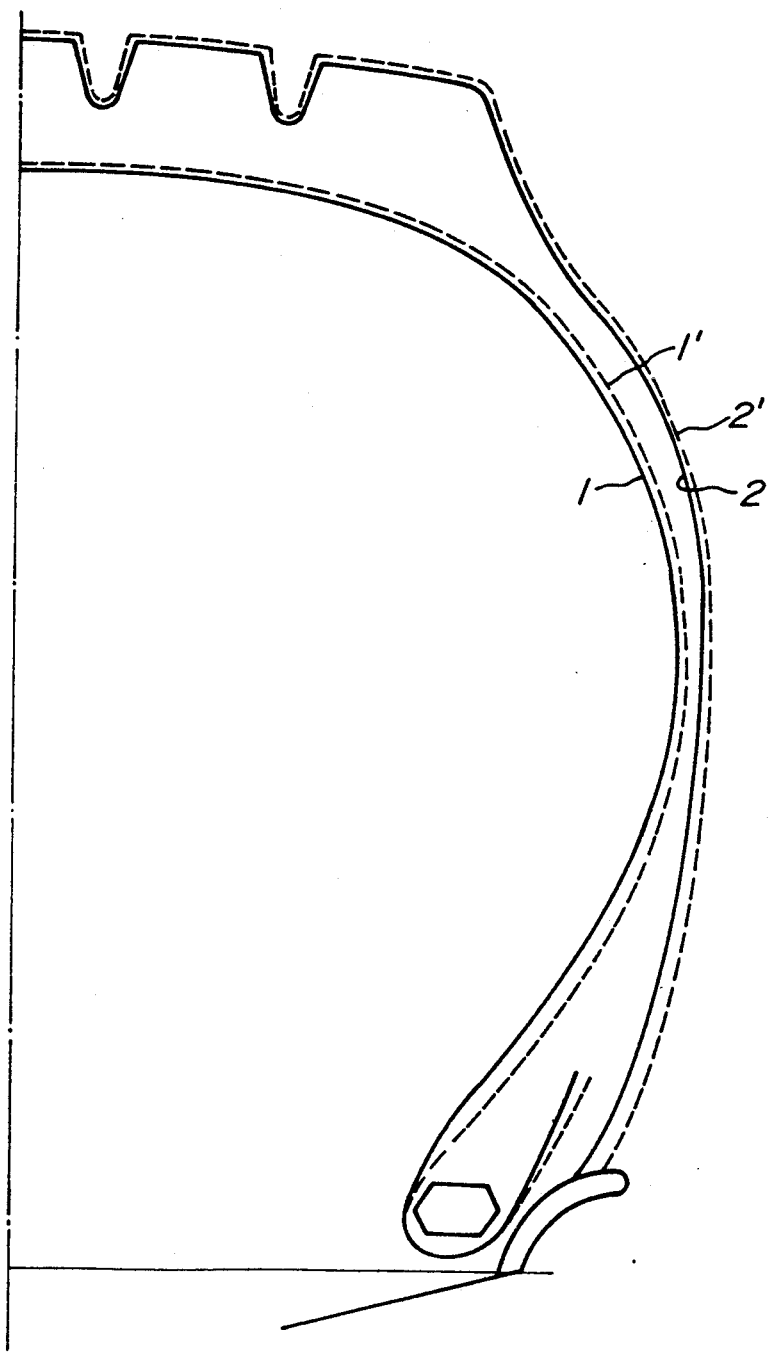

Tires of the Comparative Example 4 were produced for comparison, which were steel radial tires for trucks and buses having the naturally equilibrium configuration when filled with the normal inner pressure as shown in FIG. 4, and having values, s=1.2 mm, t=0.5 mm and u=1.0 mm with respect to its carcass line C' determined by the points B and D located at distances from the line RL:30.5 mm (0.18·H) and 157.2 mm (0.94·H), respectively, by referring to FIG. 8.

In this case, the carcass lines are considerably deviated from the carcass line C according to the invention.

$$\frac{210}{H} \times s \simeq 1.52$$

$$\frac{210}{H} \times t \simeq 0.63$$

-continued $$\frac{210}{H} \times u \simeq -1.27$$

EXAMPLE 5 OF THE INVENTION

| Tire size | 285/75 R 24.5 |
|---|---|
| Rim size | 8.25 × 24.5 |
| Normal inner pressure | 7.7 kg/cm² |
| Carcass outermost height H | 183 mm |

Steel radial tires for trucks and buses of the Example 5 of the invention were produced for trial, which had values s=5.0 mm, t=2.5 mm and u=9.0 mm with respect to its carcass line C determined the points B and D located at distances from the line RL:38.8 mm (0.21·H) and 172.5 mm (0.95·H), respectively, by referring to FIG. 6 and had values, d=2.5 mm, f=7.3 mm, and g=1.8 mm referring to FIG. 2.

COMPARATIVE EXAMPLE 5

| Tire size | 285/75 R 24.5 |
|---|---|
| Rim size | 8.25 × 24.5 (15° drop center rim) |
| Normal inner pressure | 7.7 kg/cm² |
| Carcass outermost height H | 183 mm |

Tires of the Comparative Example 5 were produced for comparison, which were steel radial tires for trucks and buses having the naturally equilibrium configuration when filled with the normal inner pressure as shown in FIGS. 3 and 4, and having values, s=1.5 mm, t=0 mm and u=0 mm with respect to its carcass line C' determined by the points B and D located at distances from the line RL:39.0 mm (0.21·H) and 172.2 mm (0.94·H), respectively, by referring to FIG. 4.

EXAMPLE 6 OF THE INVENTION

| Tire size | 11 R 22.5 |
|---|---|
| Rim size | 8.25 × 22.5 (15° drop center rim) |
| Normal inner pressure | 7.0 kg/cm² |
| Carcass outermost height H | 210 mm |

Steel radial tires for trucks and buses of the Example 6 of the invention were produced for trial, which had values s=7.0 mm, t=3.5 mm and u=12.5 mm with respect to its carcass line C determined by the points B and D located at distances from the line RL:40.5 mm (0.19·H) and 190 mm (0.90·H), respectively, by referring to FIG. 6 and had values, d=1.2 mm, f=7.5 mm, and g=1.8 mm by referring to FIG. 2.

COMPARATIVE EXAMPLE 6

| Tire size | 11 R 22.5 |
|---|---|
| Rim size | 8.25 × 22.5 (15° drop center rim) |
| Normal inner pressure | 7.0 kg/cm² |
| Carcass outermost height H | 210 mm |

Tires of the Comparative Example 6 were produced for comparison, which were steel radial tires for trucks and buses having the naturally equilibrium configuration when filled with the normal inner pressure as shown in FIG. 4, and having values, s=0.8 mm, t=0.5 mm and u=1.8 mm with respect to its carcass line C' determined by the points B and located at distances from the line RL:40.5 mm (0.19·H) and 190.0 mm (0.90·H), respectively, by referring to FIG. 8.

Comparative tests were effected to examine the effect of the increase in tension of the belts on the durability of ends of the belts by the slip angled drum test as above described.

The tires were driven at a speed of 60 km/hr with a slip angle 3° with the normal inner pressure under twice the normal load.

As results of the test, when the tires of the Examples 4, 5 and 6 of the invention had run 806 km, 818 km and 828 km, slight separations occurred at ends of plies. On the other hand, separations occurred at ends of belts when the tires of the Comparative Examples 4, 5 and 6 had run 605 km, 640 km and 603 km, respectively.

Moreover, these tires were tested with the drum testing machine for examining the durability at bead portions These tires were driven at 60 km/hr with the normal inner pressure under twice the normal load.

As results of the test, slight separations occurred at ends of plies when the tires of the Examples 4, 5 and 6 had run 19,050 km, 19,300 km and 19,750 km, respectively.

Separations occurred when the tires of the Comparative Examples 4, 5 and 6 had run 14,500 km, 15,700 km and 16,400 km.

EXAMPLE 7 OF THE INVENTION

| Tire size | 10.00 R 20 |
|---|---|
| Rim size | 7.50 V 20 (5° flat base rim) |
| Normal inner pressure | 7.25 kg/cm² |
| Carcass outermost height H | 240 mm |

Steel radial tires for trucks and buses of the Example 7 of the invention were produced for trial, which had values v=0 mm, w=7.8 mm and x=23.9 mm with respect to its carcass line C determined by the points I, F and G located at distances from the line RL:132 mm (0.55·H) and 68.5 mm (0.29·H) and 221 mm (0.92·H), respectively, by referring to FIG. 9 and had values, v=0 mm, w=7.8 mm and x=23.9 mm referring to FIG. 1. In this case, v, w and x are within the following ranges.

$$v: \text{within } 0\text{-}3.5 \text{ from } \frac{240}{H} \times v \simeq 0$$

$$w: \text{within } 4.0\text{-}9.5 \text{ from } \frac{240}{H} \times w \simeq 7.8$$

$$x: \text{within } 15\text{-}35 \text{ from } \frac{240}{H} \times x \simeq 23.9$$

COMPARATIVE EXAMPLE 7

| Tire size | 10.00 R 20 |
|---|---|
| Rim size | 7.50 V 20 (5° flat base rim) |
| Normal inner pressure | 7.25 kg/cm² |
| Carcass outermost height H | 240 mm |

Steel radial tires for trucks and buses of the Comparative Example 7 were produced for comparison, which were steel radial tires having the naturally equilibrium configuration when filled with normal inner pressure as shown in FIG. 3, and having values, v=4.3 mm, w=3.0 mm and x=9.3 mm with respect to its carcass line C' determined by the points I, F and G located at distances from the line RL:132 mm (0.55·H), 65.5 mm (0.27·H) and 217.5 mm (0.90·H), respectively, by referring to FIG. 11.

In this case, as can be seen from the following values, the carcass lines are considerably deviated from the carcass line C according to the invention.

$$\frac{240}{H} \times v \simeq 4.3 > 3.5$$

$$\frac{240}{H} \times w \simeq 0.3 < 4.0$$

$$\frac{240}{H} \times u \simeq 9.3 < 15$$

EXAMPLE 8 OF THE INVENTION

| Tire size | 7.50 R 16 |
|---|---|
| Rim size | 6.00 GS 16 |
|  | (5° flat base rim) |
| Normal inner pressure | 7.0 kg/cm² |
| Carcass outermost height H | 178 mm |

Steel radial tires for trucks and buses of the Example 8 of invention were produced for trial, which had values v=0 mm, w=3.4 mm and x=16.8 mm with respect to its carcass line C determined by the points I, F and G located at distances from the line RL:97.9 mm (0.55·H), 55.0 mm (0.31·H) and 161.0 mm (0.9·H), respectively, by referring to FIG. 9 and had values, v=0 mm, w=3.4 mm and x=16.8 mm by referring to FIG. 1.

COMPARATIVE EXAMPLE 8

| Tire size | 7.50 R 16 |
|---|---|
| Rim size | 6.00GS 16 |
|  | (5° flat base rim) |
| Normal inner pressure | 7.0 kg/cm² |
| Carcass outermost height H | 178 mm |

Tires of the Comparative Example 8 were produced for comparison, which were steel radial tires for trucks and buses having the naturally equilibrium configuration when filled with the normal inner pressure as shown in FIG. 3, and having values, v=4.8 mm, w=0.9 mm and x=4.8 mm with respect to its carcass line C' determined by the points I, F and G located at distances from the line RL:97.9 mm (0.55·H), 49.0 mm (0.28·H) and 150.0 mm (0.85·H), respectively, by referring to FIG. 11.

EXAMPLE 9 OF THE INVENTION

| Tire size | 10.00 R 20 |
|---|---|
| Rim size | 7.50 V 20 |
|  | (5° flat base rim) |
| Normal inner pressure | 7.25 kg/cm² |
| Carcass outermost height H | 241.5 mm |

Steel radial tires for trucks and buses of the Example 9 of invention were produced for trial, which had values v=0 mm, w=7.5 mm and x=28.5 mm with respect to its carcass line C determined by the points I, F and G located at distances from the line RL:132/9 mm (0.55·H), 57.5 mm (0.24·H) and 224 mm (0.93·H), respectively, by referring to FIG. 9 and had values, d=1.5 mm, f=6.5 mm and g=1.8 mm by referring to FIG. 1.

COMPARATIVE EXAMPLE 9

| Tire size | 10.00 R 20 |
|---|---|
| Rim size | 7.50 V 20 |
|  | (5° flat base rim) |
| Normal. inner pressure | 7.25 kg/cm² |
| Carcass outermost height H | 241.5 mm |

Tires of the Comparative Example 9 were produced for comparison, which were steel radial tires for trucks and buses having the naturally equilibrium configuration when filled with the normal inner pressure as shown in FIG. 3, and having values, v=4.5 mm, w=3.8 mm and x=3.8 mm with respect to its carcass line C' determined by the points I, F and G located at distances from the line RL:132.8 mm (0.55·H), 57.5 mm (0.24·H) and 224 mm (0.93·H), respectively, by referring to FIG. 11.

Comparative tests were effected to examine the effect of the increase in tension of the belts on the durability of ends of the belts by the slip angled drum test as above described.

The tires were driven at a speed of 60 km/hr with a slip angle 3° with the normal inner pressure under twice the normal load.

As results of the test, slight separations occurred when the tires of the Examples 7, 8 and 9 of the invention had run 865 km. On the other hand, separations occurred at ends of belts when the tires of the Comparative Examples 7, 8 and 9 had run 630 km, 673 km and 600 km, respectively.

Moreover, these tires were tested with a drum testing machine for examining the durability at bead portions.

These tires were driven at 60 km/hr with the normal inner pressure under twice the normal load.

As results of the test, slight separations occurred at ends of plies when the tires of the Examples 7 and 8 had run 19,450 km and 19,000 km, respectively, while the tires of the Example 9 had run 20,000 km without causing any failure.

As results of the test, slight separations occurred at ends of plies when the tires of the Examples 4, 5 and 6 had run 19,050 km, 19,300 km and 19,750 km, respectively.

Separations occurred when the tires of the Comparative Examples 7, 8 and 9 had run 14,500 km, 15,700 km and 15,000 km.

EXAMPLE 10 OF THE INVENTION

| Tire size | 11/70 R 22.5 |
|---|---|
| Rim size | 8.25 × 22.5 |
|  | (15° drop center rim) |
| Normal inner pressure | 8.0 kg/cm² |
| Carcass outermost height H | 167.5 mm |

Steel radial tires for trucks and buses of the Example 10 of invention were produced for trial, which had values v=2.5 mm, w=3.0 mm and x=15.4 mm with respect to its carcass line C determined by the points I, F and G located at distances from the line RL:92.1 mm (0.55·H), 44.3 mm (0.26·H) and 146 mm (0.87·H), respectively, by referring to FIG. 10 and had values, d=1.1 mm, f=4.2 mm, g=1.7 mm, h=13.2 mm, c=41 mm and HE=19 mm by referring to FIG. 2.

In this case, v, w and x are within the following ranges.

$$v: \text{within } 0\text{--}5.0 \text{ from } \frac{210}{H} \times v \simeq 3.13$$

$$w: \text{within } 2.0\text{--}8.0 \text{ from } \frac{210}{H} \times w \simeq 3.76$$

$$x: \text{within } 6.0\text{--}30.0 \text{ from } \frac{210}{H} \times x \simeq 19.3$$

COMPARATIVE EXAMPLE 10

| Tire size | 11/70 R 22.5 |
|---|---|
| Rim size | 8.25 × 22.5 (15° drop center rim) |
| Normal inner pressure | 8.0 kg/cm² |
| Carcass outermost height H | 166.0 mm |

Tires of the Comparative Example 10 were produced for comparison, which were steel radial tires for trucks and buses having the naturally equilibrium configuration when filled with the normal inner pressure as shown in FIG. 4, and having values, v=6.3 mm, w=1.2 mm and x=2.5 mm with respect to its carcass line C' determined by the points I, F and G located at distances from the line RL:91.3 mm (0.55·H), 44.0 mm (0.27·H) and 146.4 mm (0.88·H), respectively, by referring to FIG. 12.

In this case, the carcass lines are considerably deviated from the carcass line C according to the invention.

$$\frac{210}{H} \times v \simeq 8.0 > 5.0$$

$$\frac{210}{H} \times w \simeq 1.5 < 2.0$$

$$\frac{210}{H} \times x \simeq 3.5 < 6.0$$

EXAMPLE 11 OF THE INVENTION

| Tire size | 285/75 R 24.5 |
|---|---|
| Rim size | 8.25 × 24.5 (15° drop center rim) |
| Normal inner pressure | 7.7 kg/cm² |
| Carcass outermost height H | 183 mm |

Steel radial tires for trucks and buses of the Example 11 of the invention were produced for trial, which had values v=2.0 mm, w=3.7 mm and x=18.0 mm with respect to its carcass line C determined by the points I, F and G located at distances from the line RL:100.7 mm (0.55·H), 49.41 mm (0.27·H) and 66.5 mm (0.91·H), respectively, by referring to FIG. 10 and had values, d=2.5 mm, f=8.0 mm, and g=1.8 mm by referring to FIG. 2.

COMPARATIVE EXAMPLE 11

| Tire size | 285/75 R 24.5 |
|---|---|
| Rim size | 8.25 × 24.5 (15° drop center rim) |
| Normal inner pressure | 7.7 kg/cm² |
| Carcass outermost height H | 183 mm |

Tires of the Comparative Example 11 were produced for comparison, which were steel radial tires for trucks and buses having the naturally equilibrium configuration when filled with the normal inner pressure as shown in FIG. 4, and having values, v=5.0 mm, w=0.8 mm and x=4.0 mm with respect to its carcass line C' determined by the points I, F and G located at distances from the line RL:100.7 mm (0.55·H), 49.0 mm (0.27·H) and 166.8 mm (0.91·H), respectively, by referring to FIG. 12.

EXAMPLE 12 OF THE INVENTION

| Tire size | 11 R 22.5 |
|---|---|
| Rim size | 8.25 × 22.5 (15° drop center rim) |
| Normal inner pressure | 7.0 kg/cm² |
| Carcass outermost distance H | 210 mm |

Steel radial tires for trucks and buses of the Example 12 of the invention were produced for trial, which had values v=2.9 mm, w=3.8 mm and x=16.7 mm with respect to its carcass line C determined by the points I, F and G located at distances from the line RL:115.5 mm (0.55·H), 54.5 mm (0.26·H) and 181.0 mm (0.86·H), respectively, by referring to FIG. 10 and had values, d=1.2 mm, f=6.3 mm, and g=1.7 mm by referring to FIG. 2.

COMPARATIVE EXAMPLE 12

| Tire size | 11 R 22.5 |
|---|---|
| Rim size | 8.25 × 22.5 (15° drop center rim) |
| Normal inner pressure | 7.0 kg/cm² |
| Carcass outermost height H | 210 mm |

Tires of the Comparative Example 12 were produced for comparison, which were steel radial tires for trucks and buses having the naturally equilibrium configuration when filled with the normal inner pressure as shown in FIG. 4, and having values, v=5.8 mm, w=1.2 mm and x=5.0 mm with respect to its carcass line C' determined by the points I, F and G located at distances from the line RL:115.5 mm (0.55·H), 154.5 mm (0.26·H) and 180.7 mm (0.86·H), respectively, by referring to FIG. 12.

Comparative tests were effected to examine the effect of the increase in tension of the belts on the durability of ends of the belts by the slip angled drum test as above described.

The tires were driven at a speed of 60 km/hr with a slip angle 3° with the normal inner pressure under twice the normal load.

As results of the test, slight separations occurred at the ends of the belts when the tires of the Examples 10, 11 and 12 had run 803 km, 815 km and 833 km, respectively. On the other hand, separations occurred at the ends of belts when the tires of the Comparative Examples 10, 11 and 12 had run 605 km, 645 km and 592 km, respectively.

Moreover, these tires were tested with the drum testing machine for examining the durability at bead portions.

These tires were driven at 60 km/hr with the normal inner pressure under twice the normal load.

As results of the test, slight separations occurred at ends of plies when the tires of the Examples 10, 11 and 12 had run 18,500 km, 19,200 km and 20,000 km, respectively.

Separations occurred when the tires of the Comparative Examples 10, 11 and 12 had run 13,200 km, 16,500 km and 15,900 km.

EXAMPLE 13 OF THE INVENTION

| Tire size | 10.00 R 20 |
|---|---|
| Rim size | 7.50 V 20 |
| | (5° flat base rim) |
| Normal inner pressure | 7.25 kg/cm² |
| Carcass outermost height H | 242 mm |

Steel radial tires for trucks and buses of the Example 13 of invention were produced for trial, which had values y=10.0 mm, w=7.8 mm and x=23.9 mm with respect to its carcass line C determined by the points I, R and G located at distances from the line RL:133.1 mm (0.55·H), 72.6 mm (0.30·H) and 220 mm (0.91·H), respectively, by referring to FIG. 13 and had values, d=1.3 mm, f=6.7 mm, g=2.0 mm, h=27.0 mm, c=75.0 mm and HE=67.1 mm by referring to FIG. 1.

In this case, y, w and x are within the following ranges.

$y$: within 6.0–11.5 from $\frac{240}{H} \times y \simeq 9.9$ $w$: within 4.0–9.5 from $\frac{240}{H} \times w \simeq 7.7$ $x$: within 15–35 from $\frac{240}{H} \times x \simeq 23.7$

COMPARATIVE EXAMPLE 13

| Tire size | 10.00 R 20 |
|---|---|
| Rim size | 7.50 V 20 |
| | (5° flat base rim) |
| Normal inner pressure | 7.25 kg/cm² |
| Carcass outermost height H | 242 mm |

Tires of the Comparative Example 13 were produced for comparison, which were steel radial tires for trucks and buses having the naturally equilibrium configuration when filled with the normal inner pressure as shown in FIG. 3, and having values, y=4.4 mm, w=3.0 mm and x=9.3 mm with respect to its carcass line C' determined by the points I, R and G located at distances from the line RL:133.1 mm (0.55·H), 72.4 mm (0.30·H) and 219 mm (0.90·H), respectively, by referring to FIG. 15.

As can be seen from the following values, the carcass lines are considerably deviated from the carcass line C according to the invention.

$\frac{240}{H} \times y \simeq 4.8 < 6.0$ $\frac{240}{H} \times w \simeq 3.3 < 4.0$ $\frac{240}{H} \times x \simeq 10.2 < 15$

EXAMPLE 14 OF THE INVENTION

| Tire size | 7.50 R 16 |
|---|---|
| Rim size | 600 GS 16 |
| | (5° flat base rim) |
| Normal inner pressure | 7.0 kg/cm² |
| Carcass outermost height H | 178 mm |

Steel radial tires for trucks and buses of the Example 14 of the invention were produced for trial, which had values y=5.5 mm, w=3.4 mm and x=16.8 mm with respect to its carcass line C determined by the points I, R and G located at distances from the line RL:97.9 mm (0.55·H), 53.4 mm (0.30·H) and 162.5 mm (0.91·H), respectively, by referring to FIG. 13 and had values, d=2.8 mm, f=5.1 mm, and g=1.0 mm referring to FIG. 1.

COMPARATIVE EXAMPLE 14

| Tire size | 7.50 R 16 |
|---|---|
| Rim size | 600 GS 16 |
| | (5° flat base rim) |
| Normal inner pressure | 7.0 kg/cm² |
| Carcass outermost height H | 178 mm |

Tires of the Comparative Example 14 were produced for comparison, which were steel radial tires for trucks and buses having the naturally equilibrium configuration when filled with the normal inner pressure as shown in FIG. 3, and having values, s=3.0 mm, t=0.9 mm and u=2.5 mm with respect to its carcass line C' determined by the points I, R and G located at distances from the line RL:97.9 mm (0.55·H), 53.4 mm (0.30·H) and 162.5 mm (0.91·H), respectively, by referring to FIG. 15.

EXAMPLE 15 OF THE INVENTION

| Tire size | 10.00 R 20 |
|---|---|
| Rim size | 7.50 V 20 |
| | (5° flat base rim) |
| Normal inner pressure | 7.25 kg/cm² |
| Carcass outermost height H | 241 mm |

Steel radial tires for trucks and buses of the Example 15 of the invention were produced for trial, which had values y=9.8 mm, w=6.5 mm and x=23.5 mm with respect to its carcass line C determined by the points I, R and G located at distances from the line RL:132.6 mm (0.55·H), 72.3 mm (0.30·H) and 226 mm (0.94·H), respectively, by referring to FIG. 13 and had values, d=1.5 mm, f=5.0 mm, and g=1.8 mm by referring to FIG. 1.

COMPARATIVE EXAMPLE 15

| Tire size | 10.00 R 20 |
|---|---|
| Rim size | 7.50 V 20 |
| | (5° flat base rim) |
| Normal inner pressure | 7.25 kg/cm² |
| Carcass outermost height H | 241 mm |

Tires of the Comparative Example 15 were produced for comparison, which were steel radial tires for trucks and buses having the naturally equilibrium configuration when filled with the normal inner pressure as shown in FIG. 3, and having values, y=3.6 mm, w=3.8 mm and x=3.8 mm with respect to its carcass line C' determined by the points I, R and G located at distances from the line RL:132.6 mm (0.55·H), 72.0 mm (0.3·H) and 226.5 mm (0.94·H), respectively, by referring to FIG. 15.

Comparative tests were effected to examine the effect of the increase in tension of the belts on the durability of ends of the belts by the slip angled drum test as above described.

The tires were driven at a speed of 60 km/hr with a slip angle 3° with the normal inner pressure under twice the normal load.

As results of the test, slight separations occurred at ends of the belts when the tires of the Examples 13, 14 and 15 had run 890 km, 802 km and 851 km. On the other hand, separations occurred at ends of belts when the tires of the Comparative Examples 13, 14 and 15 had run 585 km, 640 km and 612 km, respectively, Moreover, these tires were tested with the drum testing machine for examining the durability at bead portions.

These tires were driven at 60 km/hr with the normal inner pressure under twice the normal load.

As results of the test, slight separations occurred at ends of plies when the tires of the Examples 13 and 15 had run 18,500 km and 19,000 km, respectively, while the tires of the Example 14 ran 20,000 km without causing any separation.

Separations occurred when the tires of the Comparative Examples 13, 14 and 15 had run 14,900 km, 16,000 km and 15,550 km.

EXAMPLE 16 OF THE INVENTION

| Tire size | 11/70 R 22.5 |
|---|---|
| Rim size | 8.25 × 22.5 (15° drop center rim) |
| Normal inner pressure | 8.0 kg/cm² |
| Carcass outermost height H | 168.2 mm |

Steel radial tires for trucks and buses of the Example 16 of invention were produced for trial, which had values y=4.8 mm, w=3.0 mm and x=15.4 mm with respect to its carcass line C determined by the points I, R and G located at distances from the line RL:92.5 mm (0.55·H), 50.5 mm (0.30·H) and 148 mm (0.88·H), respectively, by referring to FIG. 14 and had values, d=1.1 mm, f=4.2 mm, g=1.7 mm, h=13.2 mm, c=41 mm and HE=19 mm by referring to FIG. 2.

In this case, y, w and x are within the following ranges.

$$y:\text{ within 3.0-8.0 from } \frac{210}{H} \times y \simeq 5.99$$

$$w:\text{ within 2.0-8.0 from } \frac{210}{H} \times w \simeq 3.75$$

$$x:\text{ within 6.0-30.0 from } \frac{210}{H} \times x \simeq 19.22$$

COMPARATIVE EXAMPLE 16

| Tire size | 11/70 R 22.5 |
|---|---|
| Rim size | 8.25 × 22.5 (15° drop center rim) |
| Normal inner pressure | 8.0 kg/cm² |
| Carcass outermost height H | 167.5 mm |

Tires of the Comparative Example 16 were produced for comparison, which were steel radial tires for trucks and buses having the naturally equilibrium configuration when filled with the normal inner pressure as shown in FIG. 4, and having values, y=2.0 mm, w=1.2 mm and x=2.8 mm with respect to its carcass line C' determined by the points I, R and G located at distances from the line RL:92.1 mm (0.55·H), 50.3 mm (0.3·H) and 152 mm (0.91·H), respectively, by referring to FIG. 16.

As can be seen from the following values, the carcass lines are considerably deviated from the carcass line C according to the invention.

$$\frac{210}{H} \times y \simeq 2.5 < 3.0$$

$$\frac{210}{H} \times w \simeq 1.5 < 2.0$$

$$\frac{210}{H} \times x \simeq 3.5 < 6.0$$

EXAMPLE 17 OF THE INVENTION

| Tire size | 285/75 R 24.5 |
|---|---|
| Rim size | 8.25 × 24.5 (15° drop center rim) |
| Normal inner pressure | 7.7 kg/cm² |
| Carcass outermost height H | 183 mm |

Steel radial tires for trucks and buses of the Example 17 of the invention were produced for trial, which had values y=5.1 mm, w=3.7 mm and x=18.3 mm with respect to its carcass line C determined by the points I, R and G located at distances from the line RL:100.7 mm (0.55·H), 54.9 mm (0.30·H) and 165.5 mm (0.90·H), respectively, by referring to FIG. 14 and had values, d=2.5 mm, f=7.3 mm, and g=1.8 mm referring to FIG. 2.

COMPARATIVE EXAMPLE 17

| Tire size | 285/75 R 24.5 |
|---|---|
| Rim size | 8.25 × 24.5 (15° drop center rim) |
| Normal inner pressure | 7.7 kg/cm² |
| Carcass outermost height H | 183 mm |

Tires of the Comparative Example 17 were produced for comparison, which were steel radial tires for trucks and buses having the naturally equilibrium configuration when filled with the normal inner pressure as shown in FIG. 4, and having values, y=1.9 mm, w=0.8 mm and x=4.0 mm with respect to its carcass line C' determined by the points I, G and R located at distances from the line RL:100.7 mm (0.55·H), 54.9 mm (0.30·H) and 165.1 mm (0.90·H), respectively, by referring to FIG. 16.

EXAMPLE 18 OF THE INVENTION

| | |
|---|---|
| Tire size | 11 R 22.5 |
| Rim size | 8.25 × 22.5 |
| | (15° drop center rim) |
| Normal inner pressure | 7.0 kg/cm² |
| Carcass outermost height H | 210 mm |

Steel radial tires for trucks and buses of the Example 18 of the invention were produced for trial, which had values u=4.9 mm, w=3.8 mm and x=16.7 mm with respect to its carcass line C determined by the points I, R and G located at distances from the line RL:115.5 mm (0.55·H), 54.5 mm (0.30·H) and 181.4 mm (0.86·H), respectively, by referring to FIG. 5 and had values, d=1.2 mm, f=7.5 mm, and g=1.7 mm by referring to FIG. 2.

COMPARATIVE EXAMPLE 18

| | |
|---|---|
| Tire size | 11 R 22.5 |
| Rim size | 8.25 × 22.5 (15° drop center rim) |
| Normal inner pressure | 7.0 kg/cm² |
| Carcass outermost height H | 210 mm |

Tires of the Comparative Example 18 were produced for a comparison, which were steel radial tires for trucks and buses having the naturally equilibrium configuration when filled with the normal inner pressure as shown in FIG. 4, and having values, y=1.8 mm, w=1.2 mm and x=4.4 mm with respect to its carcass line C' determined by the points I, R and G located at distances from the line RL:115.5 mm (0.55·H), 54.5 mm (0.30·H) and 181.4 mm (0.86 H), respectively, by referring to FIG. 16.

Comparative tests were effected to examine the effect of the increase in tension of the belts on the durability of ends of the belts by the slip angled drum test as above described.

The tires were driven at a speed of 60 km/hr with a slip angle 3° with the normal inner pressure under twice the normal load.

As results of the test, slight separations occurred at the ends of the belts when the tires of the Examples 16, 17 and 18 had run 865 km, 802 km and 845 km. On the other hand, separations occurred at ends of belts when the tires of the Comparative Examples 16, 17 and 18 had run 620 km, 629 km and 598 km, respectively.

Moreover, these tires were tested with the drum testing machine for examining the durability at bead portions.

These tires were driven at 60 km/hr with the normal inner pressure under twice the normal load.

As results of the test, slight separations occurred at ends of plies when the tires of the Examples 16 and 17 had run 18,800 km and 18,550 km, respectively, while the tires of the Example 18 ran 20,000 km without causing any failure.

Separations occurred when the tires of the Comparative Examples 16, 17 and 18 had run 14,200 km, 15,750 km and 16,050 km.

As can be seen from the above explanation, the heavy duty radial tire according to the invention is considerably improved in durability at bead portions and ends of the belt.

It is further understood by those skilled in the art that the foregoing description is that of preferred embodiments of the disclosed tires and that various changes and modifications may be made in the invention without departing from the spirit and scope thereof.

What is claimed is:

1. In a heavy duty radial tire including at least one radial carcass extending from one bead portion to the other bead portion and using inextensible cords and a belt arranged outwardly of the radial carcass for reinforcing a tread of the tire, the improvement comprising; an outer profile of the tire in radial cross-sections mounted on an approved rim, said rim having a width which is not wider than that of a design rim and under no load condition during filling of said tire inner pressure from 5% to 100% of a normal inner pressure, said outer profile of the tire comprising a first profile portion expanding during filling radially outwardly in a tread zone from one end of said tread through a crown center to the other end of said tread, the ends of said tread also expanding outwardly, a second profile portion depressing axially inwardly of the tire at least in a part of a radially outer zone of a sidewall from said one end of said tread to a tire maximum width position when said tire is filled with the normal inner pressure, and a third profile portion expanding during filling axially outwardly of the tire in a radially inner zone of said sidewall from said tire maximum width position to a parting point of the sidewall from the rim flange when said tire is filled with the normal inner pressure thereby properly distributing strains occurring in the tire when inflated to a normal inner pressure, said tire mounted on a rim having a bead seat engaging said bead portions of said tire, said bead seat being inclined at a degree of 5° relative to a rotating axis of the tire, wherein a carcass profile in the radial cross-sections of the tire mounted on the approved rim and filled with an inner pressure 5% of the normal inner pressure and under no load condition is a composite curve smoothly passing through points F, A and G, where the point A is a point of contact of a carcass line C of the carcass profile with a tangent mm' in a radial direction to the carcass line at a carcass line maximum width position and the points F and G are intersections of the carcass line C and a perpendicular ll' to a bead base line RL, said perpendicular ll' spaced apart axially outwardly from an aquatorial plane M of the tire by a distance of 0.5 times a rim width corresponding to a distance between flanges of the rim, and said carcass profile fulfills three relations in millimeters, a first relation $0<240/H \times v<3.5$, where v is a maximum distance of the carcass line C spaced outwardly of a segment of line $\overline{FI}$ connecting the points F and I, where the point I is an intersection of the tangent mm' and a straight line jj' which is in parallel with a rotating axis of the tire and spaced from the bead base line RL by a distance LH of 0.55 times H, where H is a maximum height of the carcass line C from the bead base line RL, a second relation $4.0<240/H \times w<9.5$, whereby w is a maximum distance of the carcass line C spaced outwardly of an arc $\widehat{GI}$ passing through the point G contacting and tangent to the tangent mm' at the point I, and a third relation $15<240/H \times x<35$, where x is a distance between the points A and I.

2. In a heavy duty radial tire including at least one radial carcass extending from one bead portion to the other bead portion and using inextensible cords and a belt arranged outwardly of the radial carcass for reinforcing a tread of the tire, the improvement comprising; an outer profile of the tire in radial cross-sections mounted on an approved rim, said rim having a width which is not wider than that of a design rim and under no load condition during filling of said tire inner pressure from 5% to 100% of a normal inner pressure, said outer profile of the tire comprising a first profile portion expanding during filling radially outwardly in a tread zone from one end of said tread through a crown center to the other end of said tread, the ends of said tread also expanding outwardly, a second profile portion depressing axially inwardly of the tire at least in a part of a radially outer zone of a sidewall from said one end of said tread to a tire maximum width position when said tire is filled with the normal inner pressure, and a third profile portion expanding during filling axially outwardly of the tire in a radially inner zone of said sidewall from said tire maximum width position to a parting point of the sidewall from the rim flange when said tire is filled with the normal inner pressure thereby properly distributing strains occurring in the tire when inflated to a normal inner pressure, said tire mounted on a rim having a bead seat engaging said bead portions of said tire, said bead seat being inclined at a degree of 15° relative to a rotating axis of the tire, wherein a carcass profile in the radial cross-sections of the tire mounted on the approved rim and filled with an inner pressure 5% of the normal inner pressure and under no load condition is a composite curve smoothly passing through points F, A and G, where the point A is a point of contact of a carcass line C of the carcass profile with a tangent mm' in a radial direction to the carcass line at a carcass line maximum width position and the points F and G are intersections of the carcass line C and a perpendicular ll' to a bead base line RL, said perpendicular ll' spaced apart axially outwardly from an equatorial plane M of the tire by a distance of 0.5 times a rim width corresponding to a distance between flanges of the rim, and said carcass profile fulfills three relations in millimeters, a first relation $2 < 210/H \times v < 5.0$, where v is a maximum distance of the carcass line C spaced outwardly of a segment of line $\overline{FI}$ connecting the points F and I, where the point I is an intersection of the tangent mm' and a straight line jj' which is in parallel with a rotating axis of the tire and spaced from the bead base line RL by a distance LH of 0.55 times H, where H is a maximum height of the carcass line C from the bead base line RL, a second relation $2.0 < 210/H \times w < 8.0$, where w is a maximum distance of the carcass line C spaced outwardly of an arc $\overset{\frown}{GI}$ passing through the point G contacting and tangent to the tangent mm' at the point I, and a third relation $6.0 < 210/H \times X < 30.0$, where x is a distance between the points A and I.

* * * * *